United States Patent
Vick et al.

(10) Patent No.: US 11,188,891 B2
(45) Date of Patent: Nov. 30, 2021

(54) MODULAR DUAL BAND MOBILE POINT-OF-SALE TERMINAL

(71) Applicant: TOAST, INC., Boston, MA (US)

(72) Inventors: Ronald Vick, Morton Grove, IL (US); Steven P. Papa, Windham, NH (US)

(73) Assignee: Toast, Inc., Boston, MA (US)

( * ) Notice: Subject to any disclaimer, the term of this patent is extended or adjusted under 35 U.S.C. 154(b) by 139 days.

(21) Appl. No.: 16/197,755

(22) Filed: Nov. 21, 2018

(65) Prior Publication Data
US 2020/0160313 A1  May 21, 2020

(51) Int. Cl.
*G06Q 20/20* (2012.01)
*H04W 16/14* (2009.01)
*H04W 88/06* (2009.01)
H04W 84/18 (2009.01)
H04W 84/12 (2009.01)
H04L 29/08 (2006.01)

(52) U.S. Cl.
CPC ......... *G06Q 20/208* (2013.01); *G06Q 20/202* (2013.01); *H04W 16/14* (2013.01); *H04W 88/06* (2013.01); H04L 67/10 (2013.01); H04W 84/12 (2013.01); H04W 84/18 (2013.01)

(58) Field of Classification Search
CPC ... G06Q 20/202; G06Q 20/208; H04W 84/18; H04W 16/14; H04W 84/12; H04L 67/10
See application file for complete search history.

(56) References Cited

U.S. PATENT DOCUMENTS 6,694,362 B1   2/2004  Secor et al.
7,120,677 B1  10/2006  Berger et al.
(Continued)

FOREIGN PATENT DOCUMENTS

WO   WO-2015030675 A1 *  3/2015  ............. G06Q 50/12

OTHER PUBLICATIONS https://www.marketsandmarkets.com/Market-Reports/tv-white-space-spectrum-market-71081100.html (Year: 2016).*
(Continued)

*Primary Examiner* — Ariel J Yu
*Assistant Examiner* — Dana Amsdell
(74) *Attorney, Agent, or Firm* — Richard K. Huffman; Huffman Patent Group, LLC

(57) ABSTRACT

A modular mobile point-of-sale POS terminal is provided that includes a state processor, an order processor, a conventional wireless communications element, and a detachable television whitespace (TVWS)/payment processing module. The state processor queues state changes for orders in a restaurant. The order processor is coupled to the state processor and generates, accesses, and transmits to a backend server when operably connected to a network. The conventional wireless communications element enables the mobile POS terminal to communicate over a Wi-Fi network within the restaurant. The detachable television whitespace (TVWS)/payment processing module enables the mobile POS terminal to communicate over a White-Fi network within the restaurant. When programmed in a Wi-Fi mode, the mobile POS terminal communicates only over the Wi-Fi network as a selected wireless network, and when programmed in a White-Fi mode, the mobile POS terminal communicates only over the White-Fi network as the selected wireless network.

20 Claims, 8 Drawing Sheets

(56) References Cited

U.S. PATENT DOCUMENTS

| | | | |
|---|---|---|---|
| 7,568,614 B2 | 8/2009 | Pang et al. | |
| 8,320,304 B2 | 11/2012 | Deb et al. | |
| 9,204,311 B1* | 12/2015 | Banerjea | H04W 16/14 |
| 9,282,464 B2 | 3/2016 | Deb et al. | |
| 9,301,299 B2 | 3/2016 | Garnett et al. | |
| 9,526,011 B2 | 12/2016 | Lee et al. | |
| 9,582,797 B1* | 2/2017 | Holmes | G06Q 20/3224 |
| 9,762,389 B2 | 9/2017 | Smedman et al. | |
| 10,567,971 B2 | 2/2020 | Eng et al. | |
| 2007/0077883 A1* | 4/2007 | Childers | H04H 20/61 |
| | | | 455/3.05 |
| 2009/0252318 A1* | 10/2009 | Smith | H04M 3/5238 |
| | | | 379/265.1 |
| 2010/0142446 A1 | 6/2010 | Schlicht et al. | |
| 2011/0218867 A1* | 9/2011 | Cerrato | G06Q 50/12 |
| | | | 705/15 |
| 2011/0280227 A1 | 11/2011 | McCann et al. | |
| 2012/0238226 A1 | 9/2012 | Vermani et al. | |
| 2013/0195089 A1* | 8/2013 | Tandra | H04W 16/14 |
| | | | 370/338 |
| 2013/0325526 A1* | 12/2013 | Tyler | G06Q 10/02 |
| | | | 705/5 |
| 2014/0156359 A1* | 6/2014 | Morgan | G06Q 20/322 |
| | | | 705/13 |
| 2014/0156431 A1* | 6/2014 | Morgan | G06Q 20/20 |
| | | | 705/21 |
| 2015/0206116 A1 | 7/2015 | Bess et al. | |
| 2015/0237550 A1 | 8/2015 | Krisnaswamy | |
| 2016/0125449 A1* | 5/2016 | Beatty | G06Q 20/202 |
| | | | 705/14.38 |
| 2016/0155108 A1 | 6/2016 | McLaughlin et al. | |
| 2017/0046800 A1* | 2/2017 | Zomet | G06Q 50/12 |
| 2017/0134255 A1 | 5/2017 | Amini et al. | |
| 2017/0161851 A1* | 6/2017 | Li | H04W 4/14 |
| 2017/0169413 A1* | 6/2017 | Holmes | G06Q 20/20 |
| 2020/0067594 A1 | 2/2020 | Tsuchida et al. | |
| 2021/0168856 A1* | 6/2021 | Cariou | H04W 88/06 |

OTHER PUBLICATIONS

"FIFO (computing and electronics)". Wikipedia. Retrieved from https://en.wikipedia.org/w/index.php?title=FIFO_(computing_and_electronics)&oldid=773338255. Original publication date Apr. 1, 2017. pp. 1-5.

Radunovic, Bozidar et al. "Rethinking Indoor Wireless Mesh Design: Low Power, Low Frequency, Full-duplex" Wireless Mesh Networks (WIMESH 2010), 2010 Fifth IEEE Workshop on IEE, Piscataway, NJ. Jun. 21, 2010. pp. 1-6. XP031707502.

* cited by examiner

DUAL BAND RESTAURANT ORDERING SYSTEM

MODULAR DUAL BAND MOBILE POINT-OF-SALE TERMINAL

CROSS-REFERENCE TO RELATED APPLICATIONS

This application is related to the following co-pending U.S. patent applications, each of which has a common assignee and common inventors.

| Ser. No. | FILING DATE | TITLE |
| --- | --- | --- |
| 16/197,615 | Nov. 21, 2018 | DUAL BAND RESTAURANT ORDERING SYSTEM |
| 16/197,636 | Nov. 21, 2018 | DUAL BAND FIXED POINT-OF-SALE TERMINAL |
| 16/197,657 | Nov. 21, 2018 | DUAL BAND MOBILE POINT-OF-SALE TERMINAL |
| 16/197,682 | Nov. 21, 2018 | ADAPTIVE DUAL BAND MOBILE RESTAURANT TERMINAL |
| 16/197,700 | Nov. 21, 2018 | COMBINED BAND RESTAURANT ORDERING SYSTEM |
| 16/197,718 | Nov. 21, 2018 | RESTAURANT ORDERING SYSTEM EMPLOYING DUAL BAND MESH NETWORK |
| 16/197,735 | Nov. 21, 2018 | RESTAURANT ORDERING SYSTEM EMPLOYING TELEVISION WHITESPACE COMMUNICATION CHANNELS |

BACKGROUND OF THE INVENTION

Field of the Invention

This invention relates in general to the field of point-of-sale (POS) systems, and more particularly to a dual band restaurant ordering system.

Description of the Related Art

It is rare these days to walk into a retail store or restaurant that has a manually operated cash register along with manual (i.e., pencil and paper) order entry. Rather, it is more common to find one or more electronic point-of-sale (POS) terminals through which a patron may order goods and/or services. And the POS terminals do not merely record orders, but rather account for available inventory, modify items available for order based upon recent orders, and optionally provide for payment for the orders. In many scenarios, most notably restaurants, though wait staff may employ manual techniques to enter and modify orders, such orders are entered by the wait staff themselves into electronic POS terminals at selected positions within the restaurants.

Many establishments use a type of POS terminal may be configured as a mobile device, such as a smartphone or tablet, that is additionally equipped with a card or chip reader (typically plugged into an audio jack). The mobile device may run an application program that provides for order entry and fulfillment, and which further may synchronize with a server in the cloud for purposes of order payment processing and inventory management. Food trucks, mobile kiosks, and pop-ups generally use these mobile devices for order entry, fulfillment, and payment. In a present-day establishment, conventional Wi-Fi networks are ubiquitous, for they provide for access to the cloud (and server) not only for the mobile POS terminals, but also for the myriad numbers of smartphones and tablets that patrons bring into the establishment.

As one skilled in the art will appreciate, Wi-Fi coverage in any establishment can be spotty due to dead spots, degraded due to decreased signal strengths from access points, or absent altogether. All of these problems arise from the number, placement, and type of Wi-Fi access points that are disposed therein. And the number, placement, and types of Wi-Fi access points that a proprietor chooses to deploy are determined by the cost and complexity of the deployment. For example, the proprietor may determine to forego deployment of a Wi-Fi access point on, say, a porch area of the establishment because it is not as heavily trafficked as other areas of the establishment. The proprietor may choose to hide a Wi-Fi access point behind a door or in a ceiling because of aesthetic reasons, while at the same time degrading the effectiveness of the overall Wi-Fi network as a result of the placement. Consequently, employment of these mobile POS terminals, whether used by patrons or staff, becomes complicated, burdensome, or altogether impossible.

The present inventors have observed the above noted problems and disadvantages associated with present-day Wi-Fi networks, and they have further noted stop gap fallback solutions, such as the use of cellular or Bluetooth ad hoc networks when reliable Wi-Fi coverage is unavailable. As one skilled in the art will appreciate, both cellular and Bluetooth coverage are subject to the same problems as Wi-Fi networks. Accordingly, the present inventors have sensed a need in the art for an effective and reliable fallback communication technique for mobile terminals within a retail establishment, for employment when Wi-Fi access is unavailable. The present inventors have also recognized a need in the art for communication techniques within an establishment having a number of mobile POS terminals that do not suffer from the problems noted above.

Therefore, what is needed is a multi-band ordering and fulfillment system for communication with mobile POS terminals.

What is also needed is a dual band fixed POS terminal that provides for fallback communication with one or more mobile terminals within an establishment.

What is additionally needed is a dual band mobile POS terminal that is capable of communicating to a server via Wi-Fi or via a fallback television whitespace (TVWS) communication band.

What is furthermore needed is an adaptive dual band mobile restaurant POS terminal that communicates via Wi-Fi or TVWS channels as a function of coverage and network availability.

What is moreover needed is a combined band ordering system that increases coverage and throughput of orders within an establishment by simultaneously employing both Wi-Fi and TVWS channels for transmission/reception of data to/from mobile terminals.

What is yet additionally needed is an ordering system that employs a dual band mesh network.

What is further needed is a restaurant ordering system that employs both Wi-Fi and TVWS communication channels.

What is likewise needed is a modular dual band mobile POS terminal.

SUMMARY OF THE INVENTION

The present invention, among other applications, is directed to solving the above-noted problems and addresses other problems, disadvantages, and limitations of the prior art. In one aspect, a modular dual band mobile point-of-sale (POS) terminal is provided that includes a state processor, an order processor, a conventional wireless communications element, and a detachable television whitespace (TVWS)/payment processing module. The state processor is configured to queue state changes in one or more order queues that correspond to one or more orders in a restaurant. The order processor is coupled to the state processor and is configured to generate the state changes, and is configured to access and transmit the state changes in each one of the one or more order queues to a backend server, from oldest to youngest, when operably connected to a network, where the order processor comprises current order state fields corresponding to all of the orders. The conventional wireless communications element enables the mobile POS terminal to communicate over a Wi-Fi network within the restaurant. The detachable television whitespace (TVWS)/payment processing module enables the mobile POS terminal to communicate over a White-Fi network within the restaurant. When programmed in a Wi-Fi mode, the mobile POS terminal communicates only over the Wi-Fi network as a selected wireless network, and when programmed in a White-Fi mode, the mobile POS terminal communicates only over the White-Fi network as the selected wireless network.

Another aspect of the present invention contemplates a modular dual band mobile point-of-sale (POS) terminal that includes a state processor, a touchpad display/camera circuit, an order processor, a conventional wireless communications element, and a detachable television whitespace (TVWS)/payment processing module. The state processor is configured to queue state changes in one or more order queues that correspond to one or more orders in a restaurant. The touchpad display/camera circuit is configured to input menu selections and/or payment options. The order processor is coupled to the state processor and is configured to generate the state changes, and is configured to access and transmit the state changes in each one of the one or more order queues to a backend server, from oldest to youngest, when operably connected to a network, where the order processor comprises current order state fields corresponding to all of the orders. The conventional wireless communications element enables the mobile POS terminal to communicate over a Wi-Fi network within the restaurant. The detachable television whitespace (TVWS)/payment processing module enables the mobile POS terminal to communicate over a White-Fi network within the restaurant. When programmed in a Wi-Fi mode, the mobile POS terminal communicates only over the Wi-Fi network as a selected wireless network, and when programmed in a White-Fi mode, the mobile POS terminal communicates only over the White-Fi network as the selected wireless network.

A further aspect of the present invention comprehends an order fulfillment method using a dual band mobile point-of-sale (POS) terminal, the method comprising: queuing state changes in one or more order queues that correspond to one or more orders in a restaurant; generating the state changes, and accessing and transmitting the state changes in each one of the one or more order queues to a backend server, from oldest to youngest, when operably connected to a network and maintaining current order state fields corresponding to all of the orders; and employing conventional wireless communications elements that enable the mobile POS terminal to communicate over a Wi-Fi network; attaching a detachable television whitespace (TVWS)/payment processing module, enabling the mobile POS terminal to communicate over a White-Fi network within the restaurant; where, when programmed in a Wi-Fi mode, the mobile POS terminal communicates only over the Wi-Fi network as a selected wireless network, and when programmed in a White-Fi mode, the mobile POS terminal communicates only over the White-Fi network as the selected wireless network.

BRIEF DESCRIPTION OF THE DRAWINGS

These and other objects, features, and advantages of the present invention will become better understood with regard to the following description, and accompanying drawings where.

DETAILED DESCRIPTION

Figure 1:
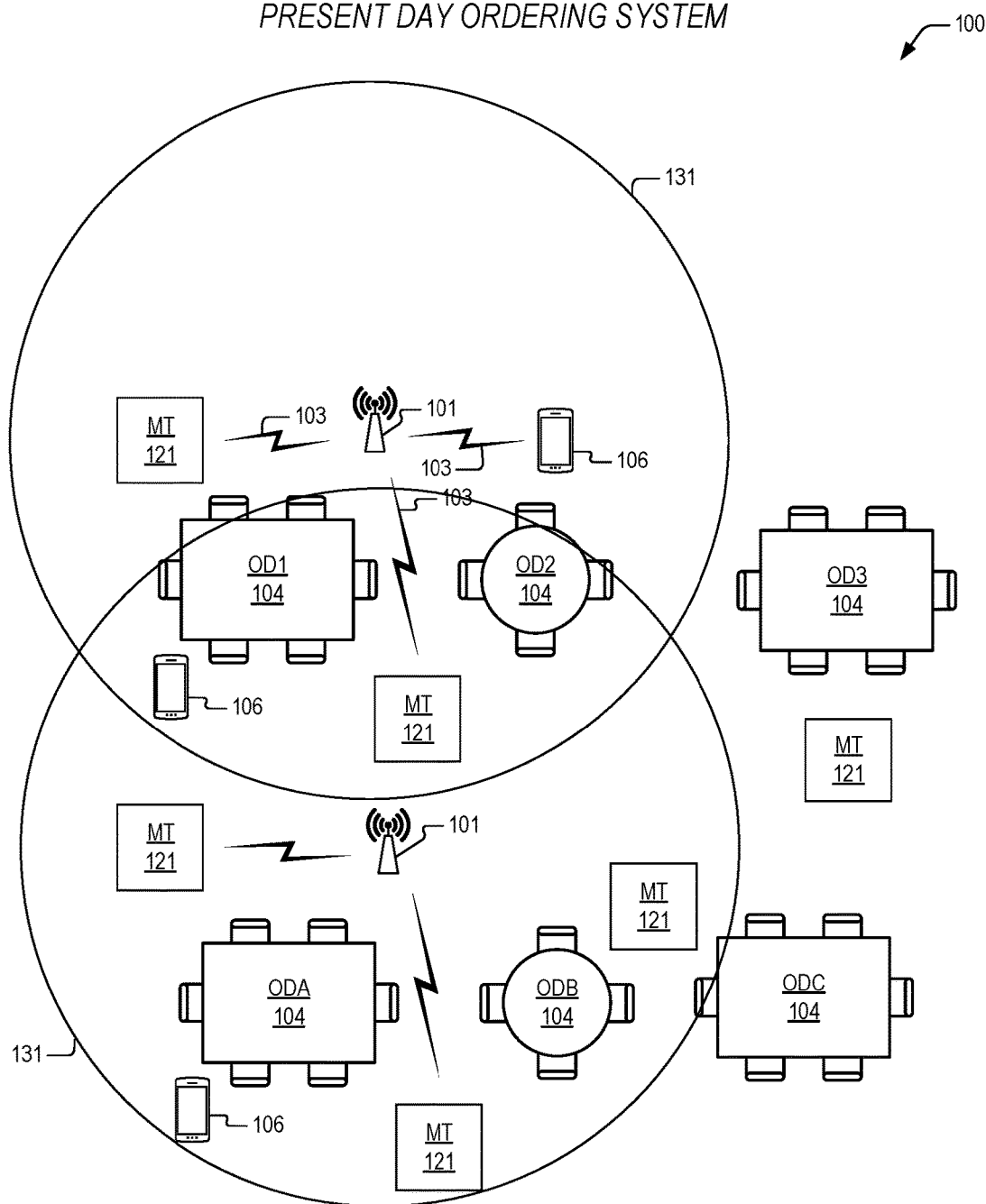
FIG. 1 is a block diagram illustrating a present-day system for fulfilling product orders to one or more patrons.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business-related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

In view of the above background discussion on present-day ordering systems and associated techniques employed therein for dealing with intermittent, poor quality, or absent Wi-Fi connections, a discussion of the disadvantages and limitations of those systems will now be presented with reference to FIG. 1. Following this, a discussion of the present invention is presented with reference to FIGS. 2-10. The present invention provides superior mechanisms and techniques that enable robust POS terminal interconnectivity within a retail establishment by employing an additional or replacement wireless network that operates using television whitespace (TVWS) channel frequencies.

Referring to FIG. 1, a block diagram is presented illustrating a present-day system for fulfilling product orders to one or more patrons, such as may be present in any of a number of different retail establishments. The system 100 may include one or more wireless access points 101 that operate over conventional wireless links 103. The conventional wireless links 103 comprise Wi-Fi links that comport with commonly employed IEEE 802.11 Wi-Fi standards that include both 2.4 GHz and 5 GHz frequencies, namely IEEE 802.11a/b/g/n. The system may include a number of ordering positions 104 that are serviced for purposes of ordering and order fulfillment by one or more mobile terminals 121 that communicate over the conventional wireless links 103. Patrons or staff within the retail establishment may also have smartphones 106 (or tablets) that connect to the internet via the wireless access points 101.

The wireless access points 101 each provide for access within a given area of coverage 131. As shown, the mobile terminals 121 within the upper area of coverage 131 may be employed to place and fulfill orders OD1 and OD2 providing that the upper access point 101 is not oversubscribed by terminals 121 and smartphones/tablets 106. Similarly, mobile terminals 121 within the lower area of coverage 131 may be employed to place and fulfill orders OD1, OD2, ODA, and ODB providing that the lower access point 101 is not oversubscribed by terminals 121 and smartphones/tablets 106. As one skilled in the art will appreciate, a mobile terminal 121 (typically a modified tablet computer) connects to the access point 101 having the highest signal strength. However, it is noted that orders OD3 and OD4 cannot be serviced by a mobile terminal 121 that is connected to the wireless network 103 because the mobile terminal 121 is outside of the coverage areas 131 and is thus unable to connect to any of the wireless access points 101. As one skilled in the art will also appreciate, the coverage areas 131 are determined not only by physical distance, but also by obstructions, as the conventional Wi-Fi links, because of frequency band, degrade when transmitting through doors, walls, windows, ceilings, and the like. Accordingly, orders OD3 and ODC must be taken and fulfilled via mechanisms other than a mobile terminal 121, namely pencil and paper.

The present inventors have observed that the scenario depicted with reference to FIG. 1 applies to virtually all present-day retail establishments, whether they are a big box store or a restaurant, for several factors affect both the number and placement of wireless access points 101. These factors may include the costs, time, or complexities associated with deploying an establishment-wide Wi-Fi network 103, the number of non-establishment devices 106 connected to an existing Wi-Fi network 103, or simply sheer aesthetics. For example, a proprietor may opt to provide Wi-Fi coverage for heavily trafficked areas, resulting in remaining areas of the establishment that have poor or no Wi-Fi coverage. Likewise, the proprietor may opt to hide Wi-Fi access points 101 in the ceiling or behind walls, simply because they detract from the aesthetics of the establishment, and thus Wi-Fi coverage is degraded because of attenuation. Similarly, because of time, cost, or complexities, the proprietor may install Wi-Fi access points 101 that are incapable of handling the establishments mobile terminals 121 in conjunction with a significant number of patron devices 106.

The system 101 of FIG. 1 exemplifies a present-day retail establishment that employs a wireless network 103 to provide for ordering and fulfillment, and the present inventors have noted that degraded, poor quality, or absent wireless coverage are substantial problems that limit an establishment's ability to effectively process orders. Disadvantages of present-day systems 100 include delay in order processing, errors in order processing, and overall annoyance of patrons. Accordingly, the present inventors have sensed a need in the art for better wireless connectivity within establishments that provides greater and more robust coverage.

The present invention overcomes the above noted limitations and disadvantages, by providing a dual band restaurant order system that employs both conventional Wi-Fi frequencies and TVWS frequencies. The present invention will now be discussed with reference to FIGS. 2-10.

Figure 2:
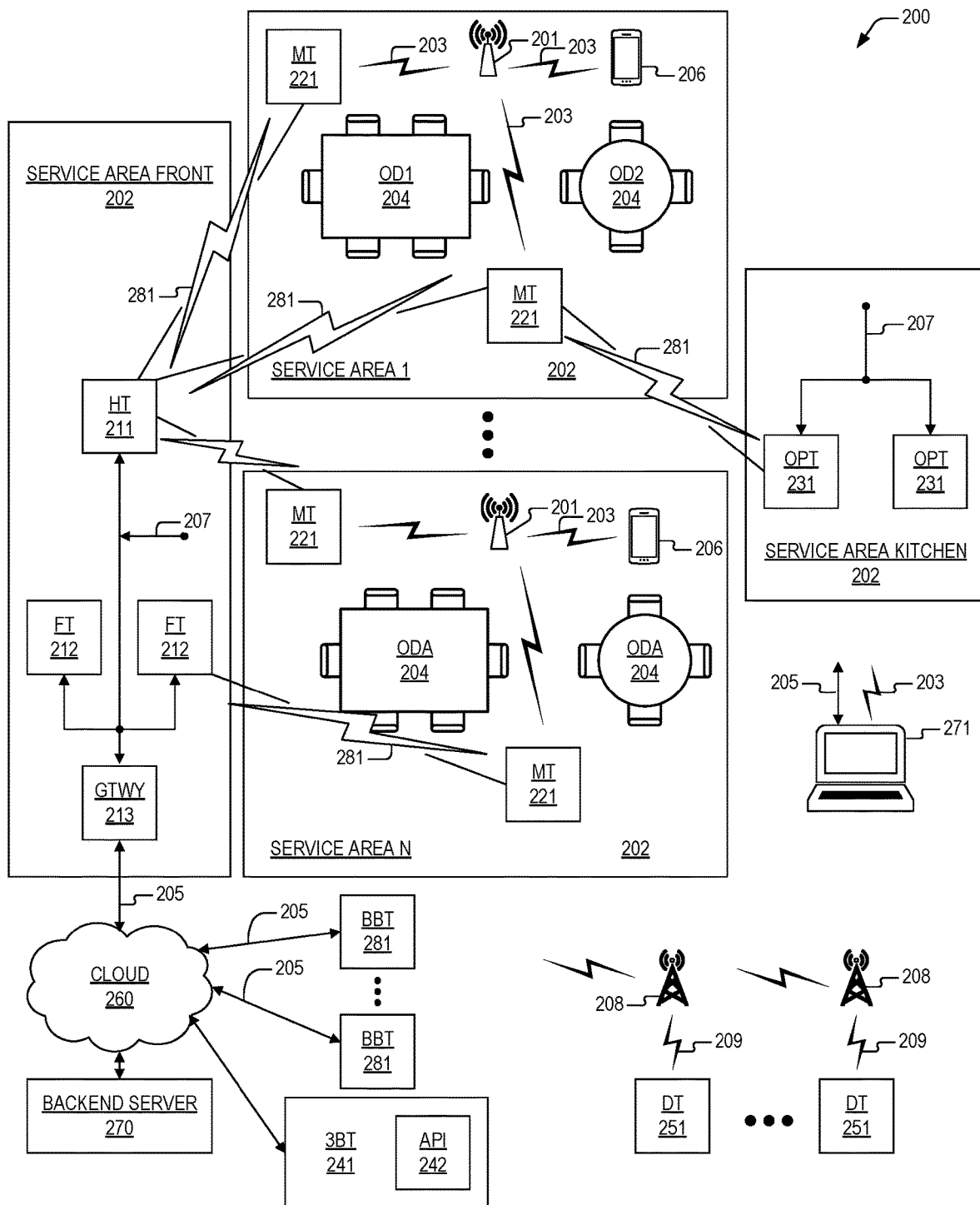
FIG. 2 is a block diagram depicting a dual band restaurant ordering system according to the present invention.

Turning to FIG. 2, a block diagram is presented depicting a dual band restaurant ordering system 200 according to the present invention. The system 200 may include one or more service areas 202, such as a front service area 202, service area 1-service area N 202, and service area kitchen 202. Going forward, the present inventors note that though the present invention is applicable to any type of retail establishment as is described above, a restaurant establishment will be henceforth employed in order to teach relevant aspects of the present invention. The present inventors further note that though restaurant terms such as host, wait staff, cook, kitchen, food item, etc. may be employed, such terms are used to more clearly teach the present invention in a given context, however, broader and different retail establishment types are contemplated.

The service areas 202 may comprise one or more wireless access points 201. The service areas 202 may also comprise dual band mobile point-of-sale (POS) terminals 221 coupled to the access points 201 via conventional wireless links 203. The service areas 202 may further comprise a gateway 213 to which are coupled one or more fixed POS terminals 211-212, 231 via a wired network 207 and which provide for coupling of the fixed terminals 211-212, 231 and access points 201 an internet cloud 260 via conventional wired links. Wired links 205, 207 may include, but are not limited to, Ethernet, cable, fiber optic, and digital subscriber line (DSL). As part of the network path to and through the cloud 260, providers of internet connectivity (e.g., ISPs) may employ wireless technologies from tower to tower, etc., but for purposes of this application, such links 205, 207 will be referred to as conventional wired links 205 to distinguish them from conventional wireless links 203, as discussed above, along with cellular links 209 (e.g., 3G, 4G, LTE). The POS terminals 211-212, 221, 231 may be configured differently to comport with intended function (i.e., host seating, order and payment entry, order processing and fulfillment, etc.), or they may be configured similarly. In one embodiment, the mobile terminals 221 may comprise a touch screen display and integral payment processor (e.g., card/chip/tap reader) that provides for both order entry, display of order status, and payment processing. As such, the host terminal 211, fixed POS terminals 212, and order processing terminals 231 may comprise larger touch screens to allow for easier viewing by restaurant staff, or they may comprise displays with keyboard entry. In one embodiment, terminals 211-212, 231 may comprise desktop computers, laptop computers, smartphones, or tablets that are running application programs or web-enabled application programs that provide for communication with a backend server 270 for purposes of order entry, status updates, payment processing, and wireless communications channel assignment.

The backend server 270 is coupled to the internet cloud 260, and an administrative console 271 that is operably coupled to the backend server 270 via a conventional wired link 205 and/or a wireless link 203. The backend server 270 is not on-premise. The administrative console 271 may be disposed within the restaurant premises and coupled to the backend server 260 via the links 203, 205, or the console 271 may be disposed in another location, say, at an operations headquarters for multiple restaurants within a given region. In addition, the system 200 may comprise one or more browser-based terminals 281 that are coupled to the backend server 270 via links 205. In one embodiment, the browser-based terminals 281 may comprise desktop computers, laptop, computers, smartphones, or tablets that are running stand-alone applications or web-enabled applications that provide for communication with the backend server 270 for purposes of order entry, status updates, and optionally, payment processing.

The system 200 may further comprise one or more third-party-based terminals 241 that are coupled to the backend server 270 via the conventional links 205 though the cloud 260. The third party-based terminals 241 may comprise desktop computers, laptop, computers, smartphones, or tablets that are running stand-alone third-party applications or web-enabled third-party applications that provide for communication with the backend server 270 for purposes of order entry, status updates, and optionally, payment processing via a proprietary application programming interface (API) 242. An example of such a terminal 241 may include the well-known GrubHub third-party application that is configured to communicate with the backend server 270 via the API 241.

The system 200 may further comprise one or more delivery terminals 251 that are coupled to one or more cellular access points 208 via conventional cellular wireless links 209, and the cellular access points 208 are coupled to the backend server 270 via the cloud 260. The mobile terminals 221 and delivery terminals 251 are configured to provide services for order entry, order fulfillment (i.e., delivery), and payment processing. In one embodiment, the delivery terminals 251 are identical to the mobile terminals 221 and are disposed as smartphone or tablets with a detachable payment processor (e.g., card/chip reader). In a further embodiment, the mobile terminals 221 and delivery terminals 251 are disposed as smartphone or tablets with a payment processor integrated within a single housing, where the payment processor comprises a module that is coupled to the smartphone/tablet via a connector. In yet another embodiment, the mobile terminals 221 and delivery terminals 251 are disposed as smartphone or tablets with a TVWS/payment processor integrated within a single housing, where the TVWS/payment processor comprises a module that is coupled to the smartphone/tablet via a connector. Other embodiments are contemplated.

Service areas 202 corresponding to the mobile terminals 221 may have one or more tables 204 corresponding to one or more orders. For clarity, service area 1 202 depicts two tables 204, one of which corresponds to order 1 OD1, and the other of which corresponds to order 2 OD2. The mobile terminals 221 within service area 1 202 may processes portions of both order 1 OD1 and order 2 OD2.

Service area N 202 depicts two tables 204, both of which correspond to order A ODA. The mobile terminals 221 within service area N 202 may both process portions order A ODA.

Though disposed within separate service areas (service area 1 202—service area N 202), the mobile terminals 221 therein may be further configured to process portions of any and all orders within the restaurant and may roam from service area 202 to service area to support work load of the restaurant.

The order processing terminals 231 may process all orders in the restaurant, or they may be configured to each process a portion of all of the orders in the restaurant according to preparation station or inventory station.

The host terminal 211 and fixed terminals 212 may be configured to process all orders in the restaurant to provide for on-premise seating assignment, order initiation, order selection, and payment processing, including closeout of orders.

One or more patrons or staff members within service area 1 202-service area N 202 may have a personal device (e.g., smartphone, tablet, laptop) 206 that can provide an ad hoc network (i.e., hotspot) to which one or more of the mobile terminals 221 may tether for purposes of communicating with the backend server 270 in the absence of Wi-Fi connectivity to the access points 201.

As one skilled in the art will appreciate, several years ago the Federal Communications Commission (FCC) abandoned use of older analog television (TV) channels corresponding to analog channels 2-69 operating at frequencies of 54-72 MHz, 76-88 MHz, 174-216 MHz, 470-680 MHz, and 614-806 MHz, and that in 2009 these frequencies were opened up for consumer use. These specific channels are commonly referred to as television whitespace (TVWS) or White-Fi channels. As one skilled will also appreciate, these frequency channels previously allowed for analog TV transmission paths upwards to 100 miles using very high power broadcast transmitters (e.g., 10,000 Watts). As one skilled will further appreciate, these channels are being employed to provide for internet infrastructure in many undeveloped parts of the world. One skilled will moreover appreciate that the FCC has provided these frequencies for both fixed and personal/portable devices to operate in the TV white spaces on an unlicensed basis; however, the devices must include a geolocation capability and capability to access a database of protected radio services. The devices provide their location to their database, which returns a list of TVWS channels on which they may operate (channel lists are specific to the location of the device). There are numerous databases and theses databases are established and administered by third parties (e.g., Google, Microsoft, etc.). The devices must register their locations in the database and provide identifying information. Devices are precluded from transmitting without checking the database and devices must recheck periodically, on the order of every 48 hours.

It is not within the scope of the present application to provide an in-depth discussion of TVWS technology and related implementations. What is relevant to the present application is that TVWS frequency channels exist for public use, provided that the foregoing requirements are met prior to and during use of the channels for communications.

The present inventors have noted that even using a low transmit power—approximately 40 milliwatts—enables TVWS wireless coverage areas within a restaurant to increase in size by a factor of 5 to 10, while simultaneously decreasing signal degradation when travelling through obstructions such as ceilings, doors, and windows.

Accordingly, the present inventors have provided the dual band system 200 of FIG. 2 that employs, in one embodiment, TVWS frequencies as a fallback communication method for scenarios as described above where conventional Wi-Fi performance is degraded, poor quality, or even absent.

Thus, the dual band system 200 according to the present invention may employ dual band mobile terminals 221 that are selectively configurable to exclusively operate using either conventional Wi-Fi 203 via the Wi-Fi access points 201 or using White-Fi. In such and embodiment, staff may configure the mobile terminals 221, via a maintenance interface, prior to deployment within the restaurant. That is, the mobile terminals 221 may be configured to use conventional Wi-Fi 203 via the Wi-Fi access points 201 in a restaurant that has excellent Wi-Fi coverage. Alternatively, the mobile terminals 221 may be configured to exclusively used White-Fi for communications, as will be described in further detail below. An exclusive White-Fi restaurant ordering system may be advantageous in scenarios where Wi-Fi coverage is not required and/or where greater coverage areas are required.

The dual band system 200 according to the present invention may employ dual band mobile terminals 221 that are dynamically configurable to operate using conventional Wi-Fi 203 via the Wi-Fi access points 201 or using White-Fi. When configured as such, in one embodiment, the mobile terminals 221 may operate in a default mode, say Wi-Fi, and switch to a fallback mode, say White-Fi, when default mode coverage is insufficient. In such an embodiment, the mobile terminals 221 themselves measure network parameters (e.g. signal strength, number of hops, etc.) and are programmed to switch from one operating mode to the next if measurements exceed programmed thresholds.

In a further embodiment, the dual band mobile terminals 221 are configurable to operate using both conventional Wi-Fi 203 and White-Fi simultaneously to allow for greater data throughput and reliability.

All of the previously described embodiments may be configured via the maintenance interface.

In an single White-Fi access point configuration, one of the fixed terminals 211-212, 231 is additionally configured as a White-Fi access point that provides for communications with designated mobile terminals 221 within the restaurant over a White-Fi link 281. In a multiple White-Fi access point configuration, a plurality of the fixed terminals 211-212, 231 are additionally configured as a White-Fi access points that provide for communications with designated mobile terminals 221 within the restaurant over plurality of White-Fi links 281. In a mesh network embodiment, a plurality of the fixed terminals 211-212, 231 are additionally configured as a White-Fi access points that provide for communications with designated mobile terminals 221 within the restaurant over a plurality of White-Fi links 281, and that additionally are configured together in a mesh network for purposes of data synchronization, including those communications designated for the designated mobile terminals 221. As such, synchronization between the fixed terminals 211-212, 231 and mobile terminals 221 may employ any of the conventional wireless links 203, wired links 207, or cellular links 209, as described above, to forward data to its destination in the mesh network. As one skilled in the art will appreciate, selection of one or more of the links 203, 207, 209 for forwarding is determined as a function of proximity and network throughput.

The system 200 of FIG. 2 shows the host terminal 211, one of the fixed terminals 212, and one of the order processing terminals 231 configured as White-Fi access points in addition to providing for their intended functions.

In one embodiment, operations are initiated when the one or more patrons enter the restaurant. Generally, a host (not shown) will create an order (along with corresponding order identifier (OID) via the host terminal 211 for the one or more patrons and will seat the patrons at one or more tables 204. The created order may include service area designation and assignment of the order to one or more mobile terminals 221. In another embodiment, mobile terminals 221 within a service area 202 are assigned to all orders within that service area 202. Other embodiments are contemplated. The created order and service area assignment are transmitted over the cloud 260 to the backend server 270, which maintains durable terminal queues within which are stored order updates for all orders in the restaurant. The backend server 270 additionally maintains a band assignment mapping, discussed below, that assigns each of the mobile terminals 221 to communicate via conventional Wi-Fi links 203, via White-Fi links 281 (including channel assignment), or both Wi-Fi links 203 and White-Fi links 281 as described above. In one embodiment, the White-Fi links comport with IEEE 802.11af standards, though other embodiments are contemplated.

Each of the plurality of durable queues correspond to each of the POS terminals 211-212, 221, 231, 251 within the system 200. When connection status to a given terminal 211, 212, 221, 231, 251 is down (i.e., the server 270 cannot verify communication with the given terminal 211, 212, 221, 231, 251), then the server maintains the order updates for that terminal 211, 212, 221, 231, 251 until connectivity is reestablished, at which time the server 270 may transmit one or more of the order updates to the terminal, verifying with each transmission that the terminal 211, 212, 221, 231, 251 received the update. Advantageously, each of the terminals 211, 212, 221, 231, 251 is capable of processing portions of any of the orders in the restaurant.

Likewise, each of the terminals 211, 212, 221, 231, 251 maintains durable order queues within which are stored order updates only for each of the orders being processed by the terminal 211, 212, 221, 231, 251. Each of the terminals 211, 212, 221, 231, 251 also maintains a plurality of order states that depict a current state for each of the orders in the restaurant. As a seated patron selects one or more menu items, wait staff enters the menu items as an update in one of the terminals 211, 212, 221, 231, 251, generally a mobile terminal 221 assigned to the given service area 202. The order update is entered into one of the durable order queues that corresponds to the order ID. If connectivity if present, then the terminal 211, 212, 221, 231, 251 transmits the order update to the server 270 and waits for the server 270 to acknowledge the order update. If acknowledged, the terminal 211, 212, 221, 231, 251 removes the order update from the one of the durable order queues. If unacknowledged (i.e., in the case of non-persistent network connectivity), the terminal 211, 212, 221, 231, 251 maintains the order update in the one of the durable order queues until such time as connectivity is reestablished, and the terminal 211, 212, 221, 231, 251 completes transmission of the order update with acknowledgement by the server 270.

Upon reception of a particular update from the server 270, the terminals 211, 212, 221, 231, 251 may check one of their plurality of order states that correspond to the particular update for conflicts, as will be described in further detail below. If a conflict exists, the terminals 211, 212, 221, 231, 251 may utilize domain specific rules to resolve the conflict in order to establish a valid order state. Each of the terminals 211, 212, 221, 231, 251 is configured with the same domain specific rules to provide for consistent resolution of order states.

Preferably, the mobile terminals 221 monitor signal strengths of the Wi-Fi access points 201 and may request connection to that access point 201 having the highest signal strength. In one embodiment, if Wi-Fi signal strength is insufficient to provide connectivity, a mobile terminal 221 may request attachment to a White-Fi access point 211, 212, 231 within the restaurant to restore communications.

As patrons continue to order items corresponding to the order ID, the one or more of the terminals 211, 212, 221, 231, 251 may enter the order updates and transmit/durably queue the order updates to the server 270 in accordance with connectivity conditions. The server 270 may also queue/transmit order updates for all orders in the restaurant to each of the terminals 211, 212, 221, 231, 251 according each terminal's connectivity. Order fulfillment, payment, and closeout are likewise handled as order updates through the server 270 and are queued/transmitted to all of the terminals 211, 212, 221, 231, 251 in accordance with the connection status of each terminal 211, 212, 221, 231, 251.

Patrons outside of the restaurant are also handled in similar fashion via the browser-based terminals 281, and third-party terminals 241, though without feedback from the server 270 regarding all orders in the restaurant. When accessed through the browser-based terminals 281 and third-party terminals 241, the server 270 creates and order ID and assigns it to one of the order processing terminals 231 for fulfillment, while sending status updates on the order ID to all of the terminals 211, 212, 221, 231, 251 via the durable terminal queue therein. The server 270 may designate a specific delivery terminal 251 for pickup, delivery, and payment based upon geofenced proximity to the restaurant, or based upon workload corresponding to the delivery terminal. Proximity to the restaurant may be determined by a number of different mechanisms, as will be described in further detail below.

The administrative console 271 may maintain a master record of all order states and order updates according to all of the terminals 211-212, 221, 231, 251 in order to provide for restaurant management, maintenance, analytics, and network traffic analyses. The console 271 may alternatively be disposed in an expediter's area of the restaurant for use by expediters in assignment and allocation of patron seating and terminals 211-212, 221, 231, 251.

The durable terminal queues and durable order queues may be disposed as battery backed random-access memory, electrically-erasable programmable read-only memory, solid state memory, hard disk memory, or a combination of the above that will provide for maintaining order updates within the queues across network and power interruptions.

Advantageously, the present invention provides for more efficient performance of computational resources within the server 270 and the POS terminals 211-212, 221, 231, 251 over that which has heretofore been provided because multiple terminals 211-212, 221, 231, 251 may be assigned to process portions of a single order, resulting in more timely processing of the single order In addition, performance is increased as a result of using White-Fi links 281 exclusively or dynamically as a fallback in the event of degraded Wi-Fi coverage. Moreover, performance is enhanced by simultaneously employing both Wi-Fi links 203 and White-Fi links 281. Similarly, any of the terminals 211-212, 221, 231, 251 in the restaurant may be immediately reassigned to a particular order to replace a malfunctioning terminal or to increase throughput of the server 270. Accordingly, computational resources 211-212, 221, 231, 251, 270 within the system 200 are afforded an overall performance improvement as a result of the present invention.

Figure 3:
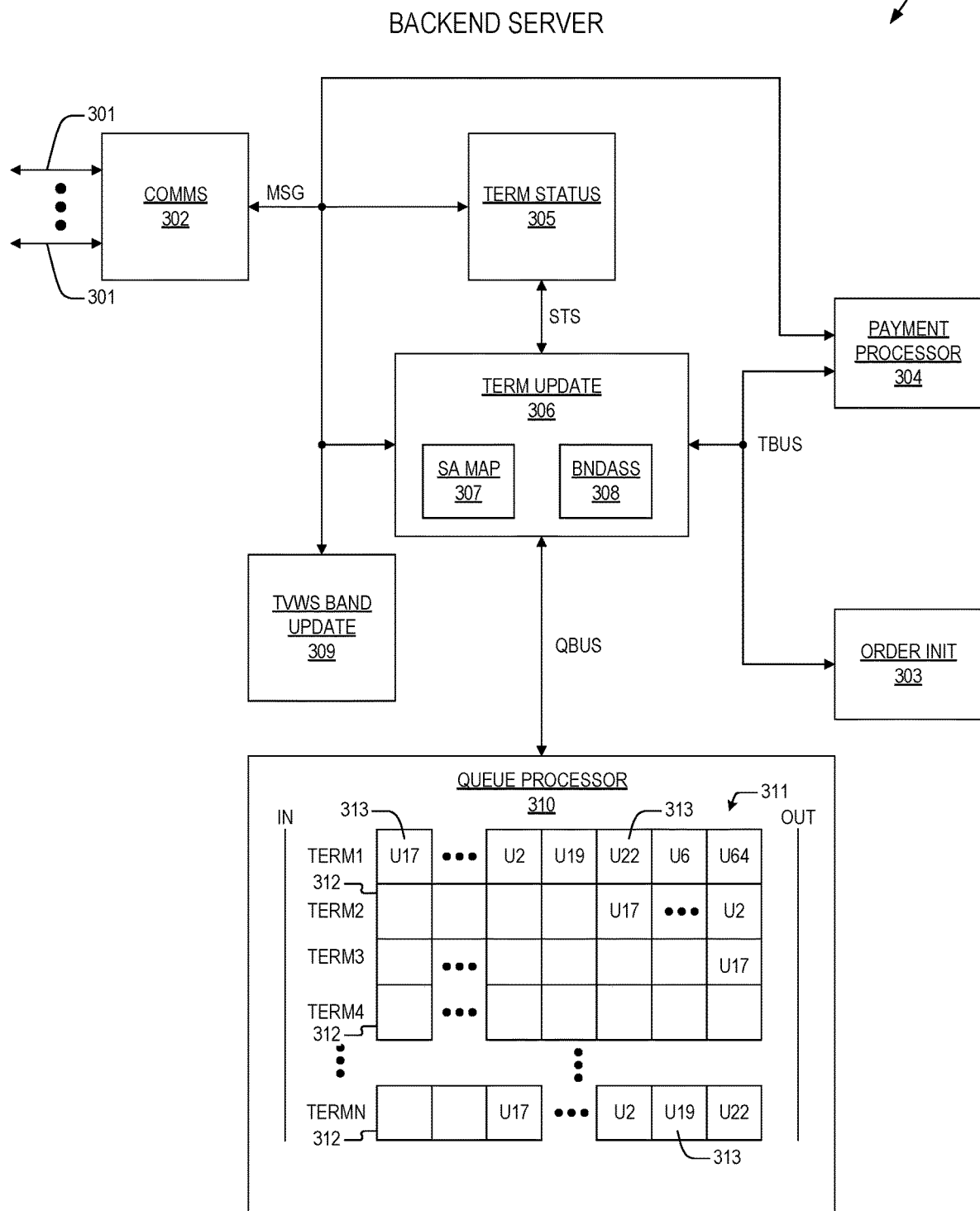
FIG. 3 is a block diagram featuring a backend server according to the present invention.

Now referring to FIG. 3, a block diagram is presented featuring a backend server 300 according to the present invention. The backend server 300 may comprise communications circuitry COMMS 302 (e.g., transceivers, modems, message formatter, etc.) that is coupled to one or more wired or conventional wireless communications links 301, examples of which are described above with reference to FIGS. 1-2. The server 300 may also comprise a terminal status element 305, a terminal update element 306, and a payment processor 304, all of which are coupled to COMMS 302 via a message bus MSG. The terminal status element 305 is coupled to the terminal update element 306 via a status bus STS. The terminal update element 306 may comprise a service area map SA MAP 307 and a terminal band assignment map 308. The terminal update element 306 is coupled to the payment processor 304 and to an order initiation element ORDER INIT 303 via a terminal bus TBUS. The terminal update element 306 is also coupled to a queue processor 310 via a queue bus QBUS. The server 300 may further comprise a TVWS band update element 309 that is coupled to the COMMS 302, the terminal status element 305, the payment processor 304, and the terminal update element 306 via the MSG bus.

The queue processor 310 may include a durable terminal queue 311 that includes terminal update records 312, each of which are associated with a corresponding POS terminal (not shown) that is employed within a given restaurant. In the embodiment of FIG. 3, N terminal update records 312 are shown, each associated with a corresponding one of N POS terminals for the given restaurant. In a large restaurant or big box environment, N may be roughly equal to 100 POS terminals, though larger and smaller numbers are contemplated.

Each of the terminal update records 312 may comprise update fields 313, which are employed to queue order updates for transmission to each of the corresponding POS terminals as connectivity to the corresponding POS terminals permits. Update fields 313 nearest to OUT are the oldest order updates queued for transmission to the corresponding POS terminals. Update fields 313 nearest to IN are youngest (or most recent) order updates queued for transmission to the corresponding POS terminals. Fields 313 between the oldest order updates and the youngest order updates descend in age from oldest to youngest update according to when those updates are received from others of the corresponding POS terminals.

Values of the order update fields 313 may include, but are not limited to, an order ID along with order details taken by the others of the corresponding POS terminals. Accordingly, the terminal update record 312 for POS terminal 1 TERM1 depicts a plurality of order update fields 313 to be transmitted to TERM1 when connectivity is reestablished with TERM1. In decreasing age from oldest to youngest order update, the fields 313 depict updates to order 64 U64, then order 6 U6, then order 22 U22, and so on, culminating with an update to order 17 U17. As one skilled in the art will appreciate, the terminal update record 312 for TERM1 is indicative that TERM1 has been offline (i.e., no connectivity) longer than any of the other POS terminals in the restaurant. This length of time may correspond to a mobile POS terminal that is serving a party on a restaurant porch that has poor Wi-Fi connectivity, or may correspond to a delivery POS terminal that is traversing an area with poor cellular coverage. The terminal update records 312 corresponding to TERM2, TERM 3, and TERMN depict a number of populated order update fields 313 less than the number of fields for TERM1, which may correspond to mobile POS terminals within the restaurant that have only slightly intermittent Wi-Fi connectivity. And the terminal update record for TERM4 through TERM N−1 contain only empty order update fields 313, thus indicated that these POS terminals are up to date on all order state changes within the restaurant. As a Wi-Fi connected terminal experiences degraded Wi-Fi connectivity, it may request fallback or supplemental communications using White-Fi over the White-Fi network, as described above with reference to FIG. 2. Assignment of a particular mobile terminal to Wi-Fi only, White-Fi only (including channel assignment), or combined Wi-Fi and White-Fi is maintained within the terminal band assignment map 308.

Operationally, the terminal status element 305 may periodically transmit a first message to each of the POS terminals using the communication mode and channels indicated by the band assignment map 308, and accessed via bus STS, and update the connectivity status of the POS terminals based upon whether they acknowledge the first message or not. In one embodiment, the first message may comprise a ping message. In one embodiment, acknowledgment may comprise a simple acknowledge message. In other embodiments, acknowledgement may comprise additional data such as received signal strength indication Wi-Fi/White-Fi RSSI, number of hops, or Global Positioning System (GPS) coordinates, as will be described in further detail below.

The terminal status element 305 may provide connectivity status of each of the POS terminals to the terminal update element 306 via bus STS. The service area map 307 is a table that associates each of the POS terminals to one or more service areas within the restaurant. In one embodiment, the terminal update element 306 may generate order update messages from oldest to youngest update for each of the POS terminals that are connected. Connectivity is maintained when a POS terminal acknowledges receipt of an order update message over its designated communication channel. Once acknowledged, the terminal update element 306 directs the queue processor 310 to delete the oldest order update for that POS terminal and shift pending order updates so that the next oldest order update becomes the oldest order update. In one embodiment, order updates are transmitted to a given POS terminal until its terminal update record 312 is empty, or until connectivity is broken.

In one embodiment, all of the POS terminals associated with the restaurant are updated by the terminal update element 306. In an alternative embodiment, POS terminals are selectively updated in accordance with their mapping to the one or more service areas. For example, the delivery POS terminals may only require knowledge of orders that are to be delivered outside the restaurant, and thus they may be mapped to a "delivery" service area so that order updates that correspond to the delivery service area are transmitted to the delivery POS terminals. Similarly, the restaurant or retail establishment may be so large that management dedicates certain POS terminals to designated service areas. Accordingly, all of the POS terminals in a given service area may be employed to update any order placed within the given service area, but they may not be employed to update orders placed outside of the given service area.

Messages received from the communications circuit 302 may also require additional functions to be performed by the backend server 300. For example, when orders are placed by a browser-based or third-party based terminal, the terminal update element 306 may transmit the order update to the order initiation element 303 via TBUS. The order initiation element 303 may then create an order ID for the order update and may assign the order ID to one or more of the POS terminals within the restaurant. Similarly, when an order update message received over the COMMS 302 requires processing of transactions outside of the POS terminals' capabilities (e.g., financial transactions with credit card providers, loyalty card discounts, etc.), the payment processor 304 may generate messages to complete the transactions and the messages are transmitted via COMMS 302. The payment processor 304 may further generate order updates (e.g., "order paid," "payment source 1 approved," "discount amount," etc.) to be transmitted to the POS terminals and may provide these updates to the terminal update element 306 via TBUS. The terminal update element 306 may then provide those updates to the durable queue 311 via QBUS, and the updates are transmitted to the POS terminals in due course dependent upon connection status, as is described above.

The present inventor notes that the term "restaurant" is employed to include those fixed and mobile POS terminals within the restaurant along with corresponding delivery POS terminals associated with the restaurant, such as delivery POS terminals 251 depicted in FIG. 2. There are no terminal update records 312 corresponding to browser-based or third-party-based terminals since orders placed on these devices are created and assigned to one of the POS terminals within the restaurant for fulfillment, preferably order processing terminals, such as the order processing terminals 231 in FIG. 2.

As discussed above with reference to FIG. 2, devices such as the dual band mobile and fixed terminals according to the present invention may operate in the TV white spaces on an unlicensed basis but the fixed device must register their locations in the TVWS database, and the TVWS database will provide one or more TVWS channel assignments for each fixed device based on its location. In addition, location information and channel assignments must be periodically updated with the TVWS database. To this end, the TVWS band update element 309 may monitor message traffic on MSG to extract GPS coordinates of all fixed terminals within the restaurant that are configured to additionally function as a White-Fi access point. The band update element 309 may further generate TVWS band update messages via the COMMS 302 that are directed to register the fixed terminals, periodically update the terminal's location information, and receive TVWS available channels for White-Fi. The update element may assign one of the TVWS available channels to all of the fixed terminals and may update the band assignment map 308 with the one of the TVWS available channels for all fixed and mobile terminals in the restaurant, regardless of whether they are enabled to communicate via White-Fi, thus enabling for fallback to White-Fi in the absence of Wi-Fi connectivity.

The backend server 300 according to the present invention is configured to perform the functions and operations as discussed above and may comprise one or more central processing units (CPUs) coupled to both transitory and non-transitory stores via conventional mechanisms. The non-transitory stores may include one or more applications programs that may be executed to perform the functions and operations discussed above. The one or more application programs may be cached within the transitory storage for speed of execution at run time. The server 300 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the server 300 may be shared with other circuits, microcode, etc., that are employed to perform other functions and/or operations within the server 300. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 4:
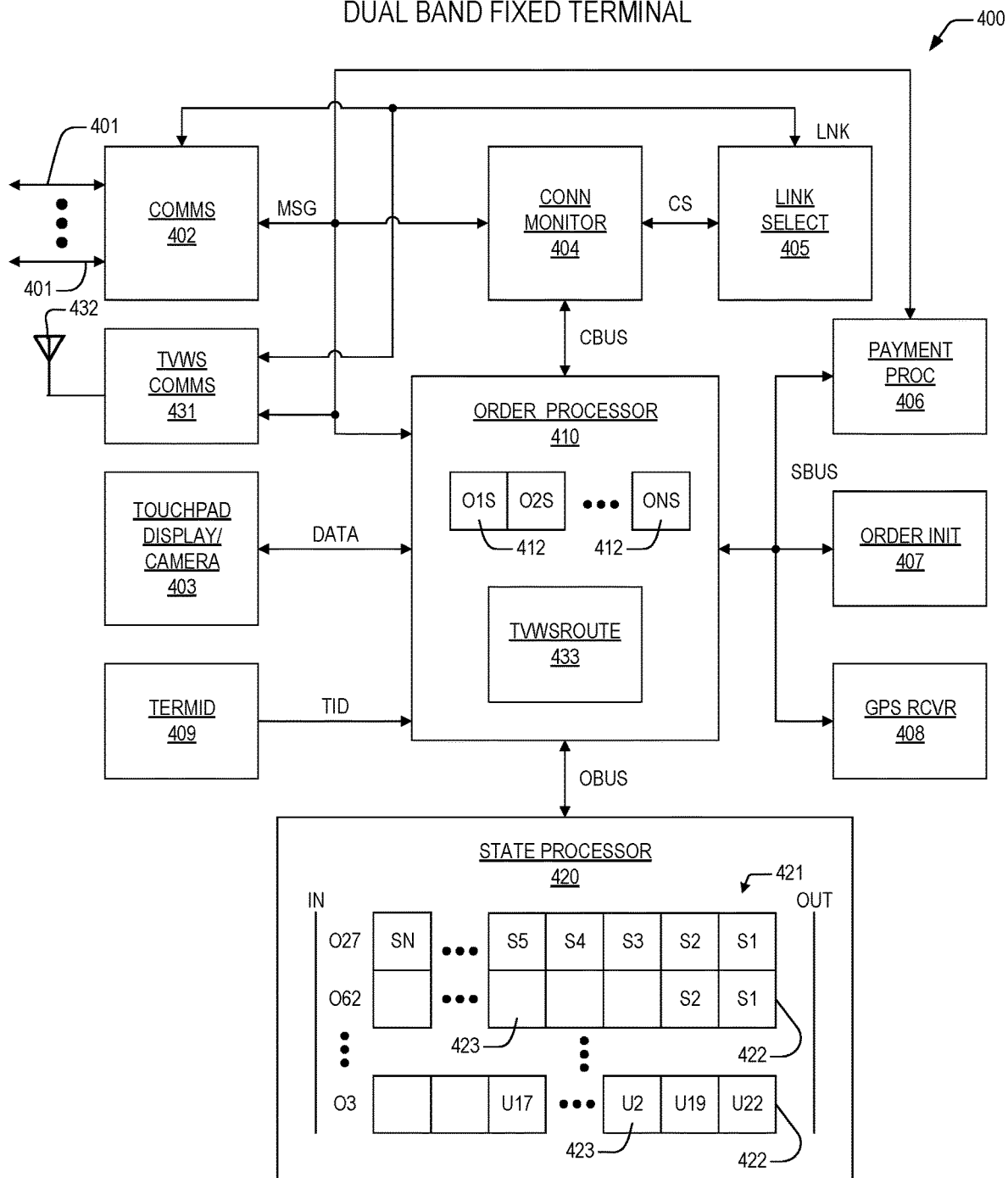
FIG. 4 is a block diagram showing dual band fixed terminal according to the present invention.

Turning now to FIG. 4, a block diagram is presented showing dual band fixed terminal 400 according to the present invention. The terminal 400 may comprise a communications circuit COMMS 402 (e.g., transceivers, modems, message formatter, etc.) that is coupled to one or more wired or conventional wireless communications links 401, examples of which are described above with reference to FIGS. 2-3. The durable POS terminal 400 may also comprise a connection monitor 404, an order processor 410, and a payment processor 406, all of which are coupled to COMMS 402 via a message bus MSG. The terminal 400 may also comprise a link select element 405 that is coupled to the connection monitor 404 via bus CS and to the COMMS 402 via bus LNK. The order processor 410 is coupled to the connection monitor 404 via bus CBUS and to the payment processor 406, an order initiation element 407, and a GPS receiver 408 via bus SBUS. The order processor 410 is coupled to a touchpad display/camera 403 via bus DATA and to terminal ID logic 409 via bus TID. The order processor 410 is also coupled to a state processor 420 via a queue bus QBUS.

The state processor 420 may include an order update queue 421 that includes order update records 422, each of which is associated with the fixed terminal 400. The terminal ID element 409 provides a unique identifier (e.g., a number) for the terminal 400, and which can then be associated with one or more orders. Contents of the terminal ID element 409 are typically entered by staff through the touchpad 403.

Each of the order update records 422 may comprise order state fields 423, which are employed to queue order state changes (i.e., order updates) for transmission to a backend server (not shown) as connectivity to the backend server permits. State fields 423 nearest to OUT are the oldest order state changes queued for transmission to the backend server. State fields 423 nearest to IN are youngest (or most recent) order state changes queued for transmission to the backend server. Fields 423 between the oldest state fields 423 and the youngest state fields 423 descend in age from oldest to youngest according to when those state changes are entered by terminal 400.

Values of the order state fields 423 may include, but are not limited to, an order ID along with order details taken by the terminal 400. Accordingly, an order update record 422 for order 27 O27 depicts a plurality of order state fields 423 to be transmitted to the server when connectivity is reestablished. In decreasing age from oldest to youngest order state change, the fields 423 depict order state changes S1 through SN. As one skilled in the art will appreciate, the order update record 422 O27 depicts that many more state changes have been entered while connection status of the POS terminal 400 is down than have been entered for orders 62 O62 through order 3 O3. Advantageously, the POS terminal 400 according to the present invention may be employed for entry of order updates even in the presence of network interruptions.

In operation, order state changes result from two sources: the touchpad display/camera circuit 403 and messages received over COMMS 402 from the backend server. In the first case, wait staff in possession of the fixed terminal 400 may enter order items as requested by patrons, or in the case of a self-service terminal 400, the patrons may enter the order items themselves. The present invention contemplates provisions within the fixed terminal 400 to display menu selections and payment options to both wait staff and patrons. Order items received from the touchpad display/camera circuit 403 are provided to the order processor 410 via bus DATA, which generates the state changes. State changes received from the server are provided to the order processor 410 in messages over bus MSG. If the fixed terminal 400 is not additionally configured as a White-Fi access point, then the TVWS communications circuit 431, antenna 432, and GPS receiver 408 are not required, however, conventional wireless links 401 may be provided in the event of failure of a hardwired link 401. In one embodiment, the fixed terminal 400 may comprise a touchpad display/camera 403 on the order of 15 inches, an example of which is a 1I-Series 2.0 for Android 15" AiO Touchscreen as produced by Elo Touch Solutions, Inc. A POS terminal 400 functioning as a fixed terminal 400 for use by wait staff may be configured similar to the kiosk, but may exhibit a larger touchpad display/camera circuit 403, an example of which is a 1I-Series 2.0 for Android 22" AiO Touchscreen as produced by Elo Touch Solutions, Inc. A fixed terminal 400 additionally functioning as a TVWS access point must include a wired link 401, the GPS receiver 408, and the TVWS communications circuit 431, and TVWS antenna 432. Order items received from the touchpad display/camera circuit 403 are provided to the order processor 410 via bus DATA, which generates the state changes. State changes received from the backend server are provided to the order processor 410 in messages over bus MSG.

The order processor 410 may maintain a current state of all orders being fulfilled by the restaurant. The current state of each of the orders are stored in order current state fields 412 therein. The order processor 410 may further include a TVWS routing table 433. The routing table 433 provides a designated TVWS channel for White-Fi communications, which is received from the backend server. The routing table 433 may further include a list of mobile terminals that are assigned to the fixed terminal for White-Fi communications. The routing table 433 may also include a routing table for all fixed terminals within a mesh network configuration that are additionally configured as White-Fi access points for purposes of forwarding message traffic.

The connection monitor 404 may monitor reception of a first message (e.g., a ping message) from the backend server and direct transmission of an acknowledgement message. The connection monitor 404 may update the connectivity status of the fixed terminal 400 accordingly. In one embodiment, acknowledgment may comprise a simple acknowledge message. In other embodiments, acknowledgement may comprise additional data such as received signal strength indication RSSI associated with one or more access points, number of hops between the backend server and the POS terminal 400, and Global Positioning System (GPS) coordinates, as will be described in further detail below.

The link select element 405 may be employed to direct the COMMS 402 to change links 401 over which to communicate with the backend server, such as switching from Wi-Fi to LTE, for example, when the fixed terminal 400 is not additionally configured to function as a White-Fi access point. In one embodiment, in the absence of connectivity within the restaurant, the link select element 405 may direct the COMMS 402 to tether to a cellular equipped device corresponding to an order ID, such as devices 206 in FIG. 2, in order to transmit acknowledgements and order state changes to the backend server. When configured to additionally function as a White-Fi access point, the link select element 405 may direct the terminal 400 to employ wired links 401 only for communication with the backend server. When White-Fi is employed as a fallback, the link select element 405 may direct that communication with mobile terminals designated for the fixed terminal occur using White-Fi at a channel assignment that is stored in the TVWS routing table 433.

As noted above, the fixed terminal 400 may also include the TVWS communication element 431 that is coupled to the analog TV band antenna 432 and that is coupled to both the MSG bus and the LNK bus. When additionally configured as a White-Fi access point, the TVWS communication element 431 may access messages received from the backend server and forward these messages to designated mobile terminals using the specific TVWS channels stored in the TVWS routing table 433. The TVWS communication element 431 may further receive messages from the designated mobile terminals over the channels stored in the TVWS routing table 433 and forward these messages to the backend server. In a mesh configuration, order processor 410 may direct the COMMS 402 to forward all message traffic to a next fixed terminal as indicated by the TVWS routing table 433.

The connection monitor 404 may provide connectivity status of the POS terminal 400 to the order processor 410 via bus CBUS. In one embodiment, the order processor 410 may generate order state change messages from oldest to youngest update for each of the orders in the queue 421. Connectivity is maintained when the POS terminal 400 receives acknowledgement of a previously transmitted order state change message from the server. Once acknowledged, the order processor 410 directs the state processor 420 to delete the oldest state change update for a corresponding order ID and shift pending updates so that the next oldest state change update becomes the oldest order update. In one embodiment, state change updates are transmitted to the server until its order state change record 422 is empty, or until connectivity is lost.

Messages received from the communications circuit 402 may also require additional functions to be performed by the fixed terminal 400. For example, when orders are placed by a browser-based or third-party based terminal, the backend server may transmit the order state change to the terminal 400 and the order processor 410 may direct the state processor 420 to create a corresponding order status record 422 in the queue 421. Similarly, when processing of transactions outside of the terminal's capabilities (e.g., financial transactions with credit card providers, loyalty card discounts, etc.) are required, the order processor 410 may direct the payment processor 406 to generate messages to the backend server to provide data (e.g., amounts, payment source type, card swipe/chip information, etc.) to complete the transactions. Such messages are transmitted via COMMS 402 or/and the TVWS COMMS 431, according to mode of operation of the fixed terminal 400. The payment processor 406 may further receive state changes (e.g., "order paid," "payment source 1 approved," "discount amount," etc.) from the server and may provide these state changes to the order processor 410 via SBUS. The order processor 410 may then provide those updates to the queue 421 via OBUS. The terminal 400 may further be employed to create an order. Accordingly, from order entry data received over DATA, the order processor 410 may direct the order initiation element 407 to create an order ID and may also direct the state processor 420 to create a corresponding order state record 422 in the queue 421.

Advantageously, the present invention provides for improvements in performance of computational resources within the fixed terminals 400 over that which has heretofore been provided because the fixed terminal 400 may be employed to process orders in the absence of conventional Wi-Fi network connectivity. In addition, computing performance is increased because the fixed terminal 400 may be employed to process any of the other orders within the restaurant since the current states 412 of all restaurant orders are resident therein. Moreover, order processing throughput is substantially increased by employing White-Fi channels in the absence of reliable conventional Wi-Fi connectivity. And throughput increases yet more when a combined band protocol (Wi-Fi and White-Fi) is employed to communicate with selected mobile terminals.

The fixed terminal 400 according to the present invention is configured to perform the functions and operations as discussed above and may comprise one or more central processing units (CPUs) coupled to both transitory and non-transitory stores via conventional mechanisms. The non-transitory stores may include one or more applications programs that may be executed to perform the functions and operations discussed above. The one or more application programs may be cached within the transitory storage for speed of execution at run time. The terminal 400 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 400 may be shared with other circuits, microcode, etc., that are employed to perform other functions and/or operations within the terminal 400. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 5:
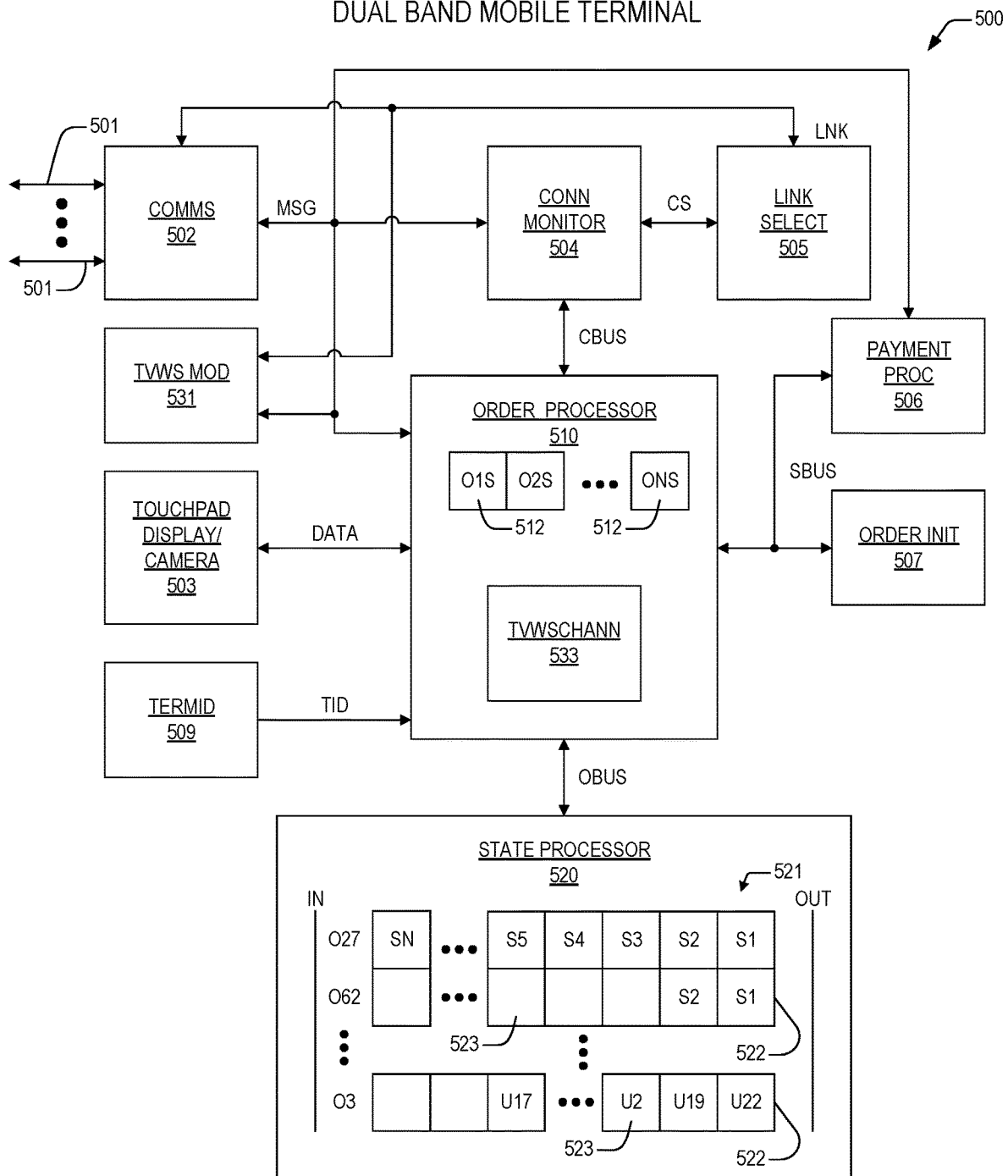
FIG. 5 is a block diagram illustrating a dual band mobile terminal according to the present invention.

Now referring to FIG. 5, a block diagram is presented illustrating a dual band mobile terminal 500 according to the present invention. The mobile terminal 500 may be adaptable for handheld use by staff and may comprise a communications circuit COMMS 502 (e.g., transceivers, modems, message formatter, etc.) that is coupled to one or more conventional wireless communications links 501, examples of which are described above. The mobile terminal 400 may also comprise a connection monitor 504, an order processor 510, and a payment processor 506, all of which are coupled to COMMS 502 via a message bus MSG. The mobile terminal 500 may also comprise a link select element 505 that is coupled to the connection monitor 504 via bus CS and to the COMMS 502 via bus LNK. The order processor 510 is coupled to the connection monitor 504 via bus CBUS and to the payment processor 506 and an order initiation element 507 via bus SBUS. The order processor 510 is coupled to a touchpad display/camera 503 via bus DATA and to terminal ID logic 509 via bus TID. The order processor 510 is also coupled to a state processor 520 via a queue bus QBUS.

The state processor 520 may include an order update queue 521 that includes order update records 522, each of which is associated with the mobile terminal 500. The terminal ID element 509 provides a unique identifier (e.g., a number) for the mobile terminal 500, and which can then be associated with one or more orders. Contents of the terminal ID element 509 are typically entered by staff through the touchpad 503.

Each of the order update records 522 may comprise order state fields 523, which are employed to queue order state changes (i.e., order updates) for transmission to a backend server (not shown) as connectivity to the backend server permits, whether that connectivity is via conventional Wi-Fi or White-Fi. State fields 523 nearest to OUT are the oldest order state changes queued for transmission to the backend server. State fields 523 nearest to IN are youngest (or most recent) order state changes queued for transmission to the backend server. Fields 523 between the oldest state fields 523 and the youngest state fields 523 descend in age from oldest to youngest according to when those state changes are entered by mobile terminal 500.

Values of the order state fields 523 may include, but are not limited to, an order ID along with order details taken by the terminal 500. Accordingly, an order update record 522 for order 27 O27 depicts a plurality of order state fields 523 to be transmitted to the server when connectivity is reestablished. In decreasing age from oldest to youngest order state change, the fields 523 depict order state changes S1 through SN. As one skilled in the art will appreciate, the order update record 522 O27 depicts that many more state changes have been entered while connection status of the mobile terminal 500 is down than have been entered for orders 62 O62 through order 3 O3. Advantageously, the mobile terminal 500 according to the present invention may be employed for entry of order updates even in the presence of network interruptions.

Figure 8:
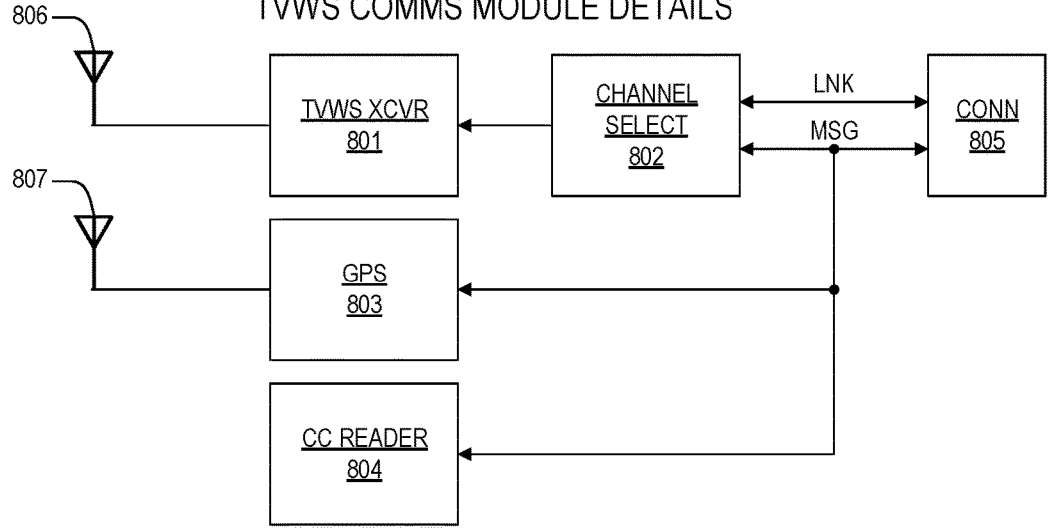
FIG. 8 is a block diagram depicting a television whitespace (TVWS) communication module, such as may be employed in the dual band mobile terminal of FIGS. 5 and 10.

In operation, order state changes result from two sources: the touchpad display/camera circuit 503 and messages received over COMMS 502 from the backend server. When White-Fi is enabled, messages from the backend server (forwarded by a fixed terminal that is additionally configured as a White-Fi access point) are also received from a TVWS module 531, which will be described in more detail below. When White-Fi is employed as a fallback to Wi-Fi, messages from the backend server are only received over the TVWS module 531. In a dual band (Wi-Fi and White-Fi) implementation, messages from the backend server are received over both COMMS 502 the TVWS module 531, as will be described in more detail below with reference to FIG. 10. Accordingly, wait staff in possession of the mobile terminal 500 may enter order items as requested by patrons, or in the case of a self-service mobile terminal 500, the patrons may enter the order items themselves. The present invention contemplates provisions within the mobile terminal 500 to display menu selections and payment options to both wait staff and patrons. Order items received from the touchpad display/camera circuit 503 are provided to the order processor 510 via bus DATA, which generates the state changes. State changes received from the backend server are provided to the order processor 510 in messages over bus MSG. If the mobile terminal 500 is not additionally configured for White-Fi communications, then the TVWS communications module 531, described in more detail with reference to FIG. 8, is not required, and may be replaced by a module (not shown) that comprises a credit card reader without White-Fi capabilities. In one embodiment, the mobile terminal 500 may comprise a touchpad display/camera 503 on the order of 7-10 inches, dependent upon menu complexity, and may comprise the Android operating system. Order items received from the touchpad display/camera circuit 503 are provided to the order processor 510 via bus DATA, which generates the state changes. State changes received from the backend server are provided to the order processor 510 in messages over bus MSG.

The order processor 510 may maintain a current state of all orders being fulfilled by the restaurant. The current state of each of the orders are stored in order current state fields 512 therein. The order processor 510 may further include a TVWS channel assignment table 533. The channel assignment table 533 provides a designated TVWS channel for White-Fi communications, which has been previously received from the backend server and which may be employed when Wi-Fi coverage is absent.

The connection monitor 504 may monitor reception of a first message (e.g., a ping message) from the backend server (sent via Wi-Fi) and direct transmission of an acknowledgement message. The connection monitor 504 may update the connectivity status of the mobile terminal 500 accordingly. In one embodiment, acknowledgment may comprise a simple acknowledge message. In other embodiments, acknowledgement may comprise additional data such as received signal strength indication RSSI associated with one or more access points (both Wi-Fi and White-Fi), number of hops between the backend server and the POS terminal 400, and Global Positioning System (GPS) coordinates, as will be described in further detail below. The connection monitor 504 may further determine that connectivity over Wi-Fi is degraded to the extent that the connection monitor may access the TVWS channel assignment table 533 and direct the link select element 505 to connect to the backend server via one or more fixed terminals that are additionally configured to function as TVWS access points. The connection monitor 504 may provide the designated TVWS channel to the link select element 505 which, in turn, will direct that subsequent outgoing messages to the backend server be over White-Fi, and the link select element 505 will provide the designated TVWS channel to the TVWS module via bus LNK.

The link select element 505 may be employed to direct the COMMS 502 to change conventional wireless links 501 over which to communicate with the backend server, such as switching from Wi-Fi to LTE. In one embodiment, in the absence of connectivity within the restaurant (both Wi-Fi and White-Fi), the link select element 505 may direct the COMMS 502 to tether to a cellular equipped device corresponding to an order ID, such as devices 206 in FIG. 2, in order to transmit acknowledgements and order state changes to the backend server.

The connection monitor 504 may provide connectivity status of the mobile terminal 500 to the order processor 510 via bus CBUS. In one embodiment, the order processor 510 may generate order state change messages from oldest to youngest update for each of the orders in the queue 521. Connectivity is maintained when the mobile terminal 500 receives acknowledgement of a previously transmitted order state change message from the backend server. Once acknowledged, the order processor 510 directs the state processor 520 to delete the oldest state change update for a corresponding order ID and shift pending updates so that the next oldest state change update becomes the oldest order update. In one embodiment, state change updates are transmitted to the backend server until its order state change record 522 is empty, or until connectivity is lost.

Messages received from the communications circuit 502 may also require additional functions to be performed by the fixed terminal 500. For example, when orders are placed by a browser-based or third-party based terminal, the backend server may transmit the order state change to the terminal 500 and the order processor 510 may direct the state processor 520 to create a corresponding order status record 522 in the queue 521. Similarly, when processing of transactions outside of the terminal's capabilities (e.g., financial transactions with credit card providers, loyalty card discounts, etc.) are required, the order processor 510 may direct the payment processor 506 to generate messages to the server to provide data (e.g., amounts, payment source type, card swipe/chip information, etc.) to complete the transactions. Such messages are transmitted via COMMS 502 or/and the TVWS module 531. The payment processor 506 may further receive state changes (e.g., "order paid," "payment source 1 approved," "discount amount," etc.) from the backend server and may provide these state changes to the order processor 510 via SBUS. The order processor 510 may then provide those updates to the queue 521 via OBUS. The terminal 500 may further be employed to create an order. Accordingly, from order entry data received over DATA, the order processor 510 may direct the order initiation element 507 to create an order ID and may also direct the state processor 520 to create a corresponding order state record 522 in the queue 521.

Advantageously, the present invention provides for improvements in performance of computational resources within the mobile terminals 500 over that which has heretofore been provided because the mobile terminal 500 may be employed to process orders in the absence of conventional Wi-Fi network connectivity. In addition, computing performance is increased because the mobile terminal 500 may be employed to process any of the other orders within the restaurant since the current states 512 of all restaurant orders are resident therein. Moreover, order processing throughput is substantially increased by employing White-Fi channels in the absence of reliable conventional Wi-Fi connectivity. And throughput increases yet more when a combined band protocol (Wi-Fi and White-Fi) is employed to communicate with fixed terminals additionally configured as White-Fi access points.

The mobile terminal 500 according to the present invention is configured to perform the functions and operations as discussed above and may comprise one or more central processing units (CPUs) coupled to both transitory and non-transitory stores via conventional mechanisms. The non-transitory stores may include one or more applications programs that may be executed to perform the functions and operations discussed above. The one or more application programs may be cached within the transitory storage for speed of execution at run time. The terminal 500 may comprise digital and/or analog logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the terminal 500 may be shared with other circuits, microcode, etc., that are employed to perform other functions and/or operations within the terminal 500. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor.

Figure 6:
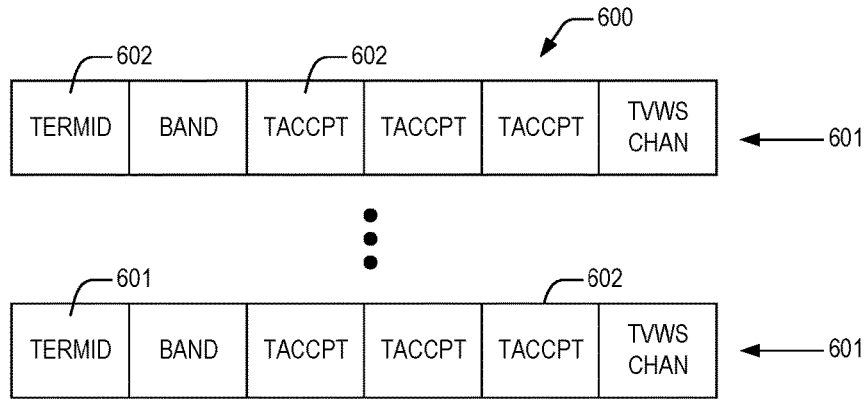
FIG. 6 is a block diagram detailing an exemplary band assignment map for fixed and mobile terminals, such as may be employed in the backend server of FIG. 3.

Turning now to FIG. 6, a block diagram is presented detailing an exemplary band assignment map 600 for fixed and mobile dual band terminals, such as may be employed in the backend server of FIG. 3. The exemplary band assignment map 600 may comprise a plurality of band assignment records 601, each associated with a corresponding dual band terminal within the restaurant. Each of the band assignment records 601 may comprise a plurality of fields 602. In the records 601 shown in FIG. 6, there is a terminal ID field TERMID that identifies a corresponding dual band mobile terminal, a band selection field BAND that, in one embodiment, designates that communication with the corresponding mobile terminal occur over convention Wi-Fi only, White-Fi only, or both Wi-Fi and White-Fi. The records 601 also have a plurality of TVWS access point fields TACCPT that may indicate a corresponding plurality of dual band fixed terminal IDs for employment as TVWS access points. Though three TACCPT fields 602 are depicted for each record 601, other numbers of TACCPT fields 602 are contemplated, as is a function of restaurant configuration. Finally, the records have a TVWS channel field TVWS CHAN, which the backend server terminal update element stores based upon the most recent query to the TVWS database by the TVWS band update element.

The backend server employs entries 601 in the band assignment map 600 to determine whether to direct messages for a given mobile terminal over the COMMS 302 designating a Wi-Fi access point for routing to the mobile terminal, one or more fixed terminals additionally configured as a White-Fi access point for routing to the mobile terminal, or both Wi-Fi access points and White-Fi access points, when the restaurant ordering system is operating in a combined dual band mode for communication with selected mobile terminals. When operating in a combined dual band mode, terminal update logic within the backend server will also divide message data to the selected mobile terminals between White-Fi and Wi-Fi to optimize data throughput utilizing both networks. The terminal update logic within the backend server will also combine message data from the selected mobile terminals what is received via the White-Fi and Wi-Fi networks.

Figure 7:
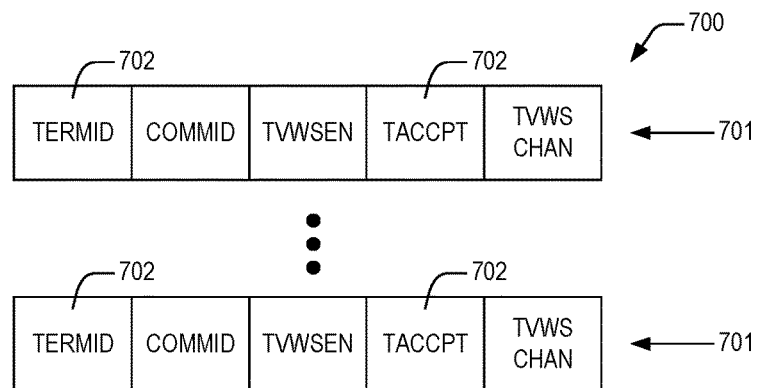
FIG. 7 is a block diagram illustrating details of a TVWS routing table according to the present invention, such as may be employed in the fixed terminals of FIGURE.

Now referring to FIG. 7, a block diagram is presented illustrating details of a TVWS routing table 700 according to the present invention, such as may be employed in the fixed terminal of FIG. 4. The routing table 700 may comprise a plurality of mobile terminal records 701, each of which is associated with a corresponding dual band mobile terminal within the restaurant. The records 701 may comprise a plurality of fields 702 that include a terminal ID field TERMID, a communication mode ID field COMMID, a TVWS enable field TVWSEN, a TVWS access point field TACCPT, and a TVWS channel designation field TVWS CHAN. The TERMID field 702 uniquely identifies the corresponding dual band mobile terminal. Contents of COMMID may direct that communications with the designated dual band mobile terminal occur over Wi-Fi only, White-Fi only, or combined Wi-Fi and White-Fi. Contents of TACCPT field 702 identifies one or more fixed terminals within the restaurant that may serve as White-Fi access points for the corresponding mobile terminal. Contents of TVWS CHAN designate a White-Fi channel for communication with the corresponding mobile terminal.

In one embodiment, the fixed dual band terminal may access the TVWS routing table records 701 to determine whether to intercept messages received over the wired link in order to forward them on to a dual band mobile terminal over White-Fi. For example, if the terminal ID for the fixed terminal matches the TACCPT field contents for any record 701, the fixed terminal may then intercept message from the backend server for those corresponding mobile terminals (identified by contents of TERMID fields 702), and may forward those messages to the corresponding mobile terminals over White-Fi on the TVWS channel indicated by contents of TVWS CHAN. The fixed terminal may also receive messages from the corresponding mobile terminals over the TVWS channel and may forward those messages to the backend server over the wired link.

Figure 10:
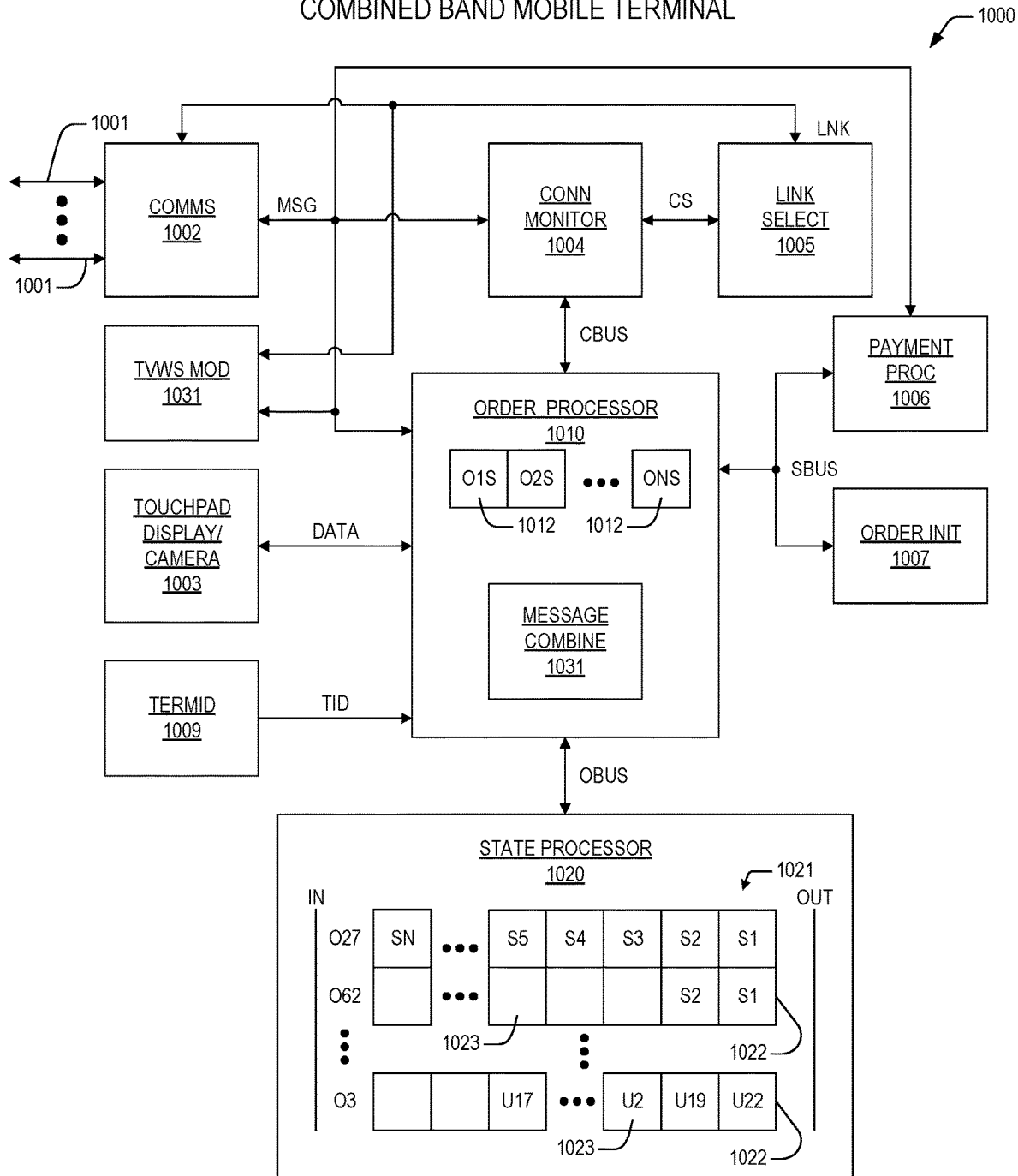
FIG. 10 is a block diagram illustrating a combined band mobile terminal according to the present invention.

Now turning to FIG. 8, a block diagram is presented depicting a television whitespace (TVWS) communication module 800, such as may be employed in the dual band mobile terminals of FIGS. 2, 5, and 10. The communication module 800 may comprise a TVWS transceiver 801 that is coupled to a TVWS antenna 806 and to channel select logic 802. The communication module 800 may further comprise a GPS transceiver 803 that is coupled to a GPS antenna 807. A message bus MSG interconnects the channel select logic 802, the GPS transceiver 803 and a credit card reader 804. A link bus LNK is coupled to the channel select logic 802. Both LNK and MSG are coupled to a connector 805 or connection device. As noted above, the mobile terminals may be disposed as smartphone or tablets with a payment processor integrated within a single housing, where the payment processor comprises a module that is coupled to the smartphone/tablet via a connector. In this case, the module 800 may be replaced with a payment processor module (not shown) that includes only a credit card reader, as would be the case for a delivery terminal. As additionally noted above, the mobile terminals may be disposed as smartphone or tablets with a TVWS/payment processor 800 integrated within a single housing, where the TVWS/payment processor 800 comprises a module that is coupled to the smartphone/tablet via a connector. Alternatively, the connector 805 may comport with an existing port or connector protocol that is employed on a smartphone or tablet, such as, but not limited to, a USB connector or a PCie connector. Rather than being integrated into a single housing, the TVWS/payment processor 800 may merely be connected via a cable to the smartphone/tablet, thus providing, say, a legacy mobile terminal with the payment processing and White-Fi communications capabilities.

Though not explicitly shown in the block diagram of FIG. 4, the TVWS/payment processor 800, may be employed in place of the TVWS COMMS element 431 and the TVWS antenna 432, as is describe above in modular embodiments of the mobile terminal. Accordingly, a legacy fixed terminal, having only conventional wired and wireless communications capabilities over COMMS 402, and having an existing port or connector, can easily be upgraded via connection of the module 800 to the existing port of connector to additionally provide for payment processing and White-Fi communications.

The TVWS communication module 800 is provided according to the present invention to allow for a modular adaptation of the mobile terminals of FIGS. 2 and 5 to provide for White-Fi communications and payment processing, or payment processing only. In operation, credit card information is provided over bus MSG to payment processing logic within the mobile terminal when a credit card is swiped, dipped, or tapped. In addition, messages to/from a TVWS access point are transmitted/received via the TVWS antenna 806 and transceiver 801 over a TVWS channel provided via LNK and designated via the channel select logic 802. The GPS receiver 803 and antenna 807 are optional, and if employed may be used to provide location information of the mobile terminal within which the module 800 is disposed. Advantageously, the TVWS communications module 800 according to the present invention allows for selective adaptation of table-based mobile terminals to provide for either payment processing only, or payment processing and White-Fi network communications.

Figure 9:
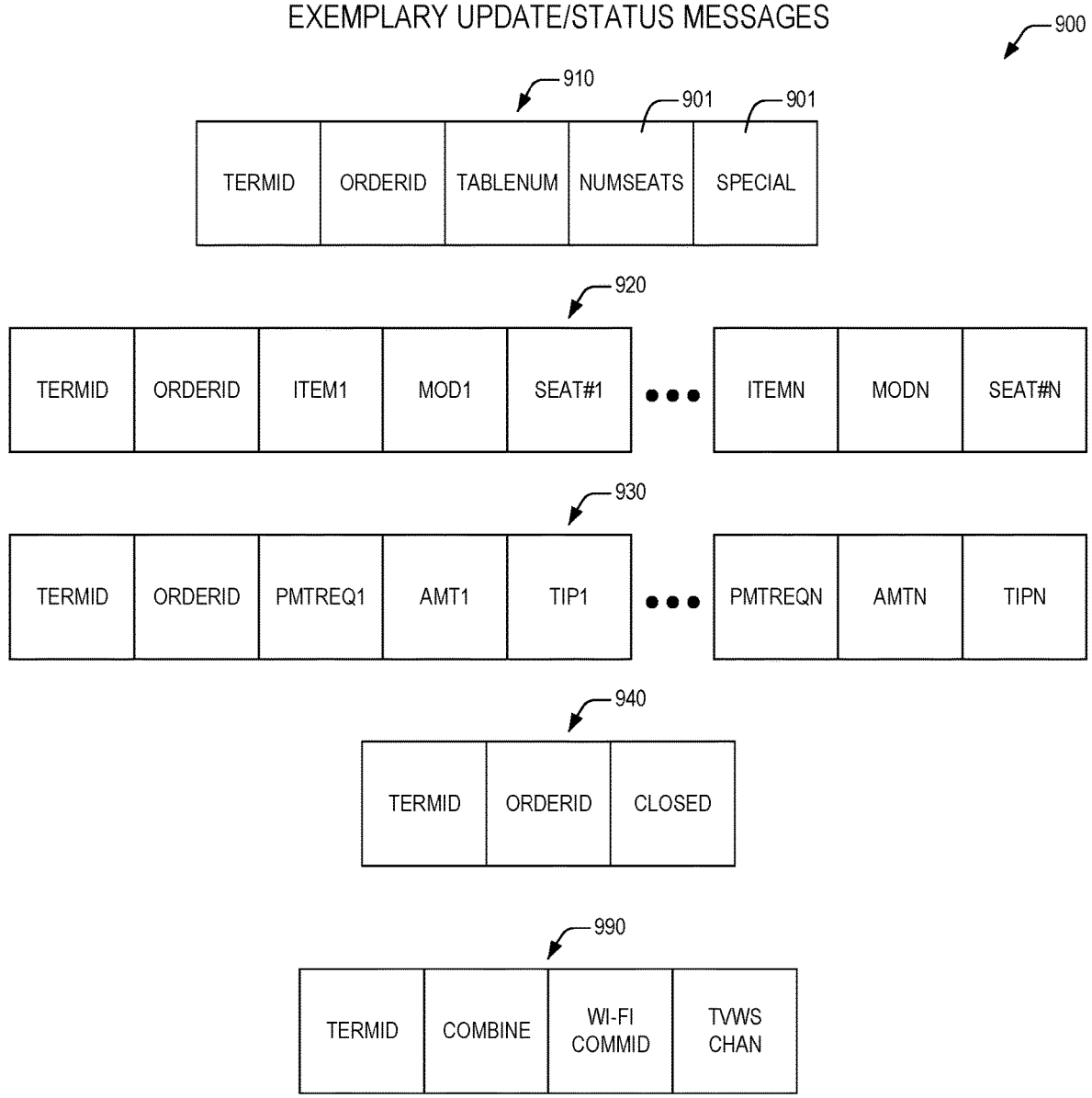
FIG. 9 is a block diagram detailing exemplary update/status messages according to the present invention that flow between a backend server and dual band fixed and mobile terminals.

Referring now to FIG. 9, a block diagram 500 is presented illustrating exemplary update/status messages according to the present invention that flow between a backend server and fixed and mobile terminals.

An order assignment message 910 transmitted by the server to one or more terminals may comprise fields 901 having a specific terminal ID TERMID assigned for a particular order ID ORDERID along with a table number TABLENUM having a given number of seats NUMSEATS. The message 910 may further comprise a SPECIAL field 901 via which special requirements (e.g., high chair, wheel chair access) are communicated to the terminal.

An order state change message 920 transmitted from a fixed or mobile terminal to the server may comprise TERMID and ORDERID fields 901 as described above, along with one or more groups of ITEM, MOD, and SEAT #fields 901, where contents of the ITEM field 901 indicated a menu item ordered for a given seat number at the table along with any modifications to the item number (e.g., rare, no onions, etc.).

A payment state change message 930 transmitted from a terminal to the server may comprise TERMID and ORDERID fields along with one or more groups of PMTREQ, AMT, and TIP fields 901, where contents of the PMTREQ field 901 indicate a payment type (e.g., cash, MasterCard, etc.), and contents of AMT and TIP fields 901 indicate amount of payment for the particular payment type along with a tip amount.

An order closeout message 940 may comprise TERMID and ORDER ID fields 901 as noted above, along with a CLOSED field 901, the contents of which indicate whether the particular order ID is open or closed.

A dual band message 990 may be transmitted from the server to a fixed terminal that is additionally configured as a White-Fi access point. The message 990 may have a TERMID field, the contents of which identify a specific mobile terminal. The message 990 may further include a combine band field COMBINE, the contents of which indicate the communication mode for the specific mobile terminal, namely, Wi-Fi only, White-Fi only, or combined Wi-Fi and White-Fi.

The messages 910, 920, 930, 940, 990 are not exhaustive of those what may be employed according to the present disclosure but are provided herein to teach further aspects and advantages according to the present invention.

Finally turning to FIG. 10, a block diagram is presented illustrating a combined band mobile terminal 1000 according to the present invention. The combined band mobile terminal 1000 is virtually the same as the dual band mobile terminal 500 of FIG. 5, where elements in the combined band mobile terminal operate in the same manner as those like-named elements of the dual band mobile terminal. In addition, the combined band mobile terminal 1000 may comprise message combine logic 1031 in place of the TVWS channel logic 533 of FIG. 5. In addition to performing the functions described above to the TVWS channel logic 533, the combine logic 1031 may further combine message data designated for the terminal 1000 that is received over both Wi-Fi and White-Fi channels, and may further split data that is designated for the backend server for transmission over both Wi-Fi and White-Fi.

Although the above embodiments are presented to clearly teach the present invention, other embodiments are contemplated as well. As is disclosed herein, mobile dual band terminals may comprise conventional wireless communications links such as Wi-Fi, cellular (e.g., 3G, 4G, LTE), Bluetooth, etc., and are additionally configured for White-Fi communications. Likewise, fixed terminals according to the present invention may comprise wired communication links (e.g., Ethernet) and conventional wireless communications links such as Wi-Fi, cellular (e.g., 3G, 4G, LTE), Bluetooth, etc., and are additionally configured for White-Fi communications. One embodiment of the fixed terminal of FIG. 4 contemplates its use as a White-Fi access point for communications with designated mobile terminals. However, another embodiment of the present invention comprehends a system of fixed terminals and mobile terminals that couple to one or more stand-alone White-Fi base stations (not shown), where the White-Fi base station functions as White-Fi access points, substantially similar in function to a conventional Wi-Fi access point.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The storage medium may be non-transitory or transitory. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A modular dual band mobile point-of-sale (POS) terminal, comprising:

a state processor, configured to queue state changes in one or more order queues disposed within the mobile POS terminal that correspond to orders in a restaurant;

an order processor, coupled to said state processor, configured to generate said state changes, and configured to access and transmit said state changes in each one of said one or more order queues to a backend server, from oldest to youngest, when operably connected to a network, wherein said order processor comprises current order state fields corresponding to all of said orders in said restaurant;

a conventional wireless communications element, enabling the mobile POS terminal to communicate over a Wi-Fi network within said restaurant; and a detachable television whitespace (TVWS)/payment processing module, enabling the mobile POS terminal to communicate over a White-Fi network within said restaurant;

wherein, when programmed in a Wi-Fi mode, the mobile POS terminal communicates only over said Wi-Fi network as a selected wireless network, and when programmed in a White-Fi mode, said mobile POS terminal communicates only over said White-Fi network as said selected wireless network.

2. The mobile POS terminal as recited in claim 1, wherein said network comprises the internet and said selected wireless network.

3. The mobile POS terminal as recited in claim 2, wherein said backend server comprises a cloud-based server.

4. The mobile POS terminal as recited in claim 3, wherein the mobile POS terminal and other POS terminals are configured to generate unique ones of said state changes corresponding to a same one of said one or more orders.

5. The mobile POS terminal as recited in claim 4, wherein, when programmed to operate in said Wi-Fi mode, said mobile POS terminal operably connects to said network via one or more Wi-Fi access points that are disposed within said restaurant.

6. The mobile POS terminal as recited in claim 4, wherein, when programmed to operate in said White-Fi mode, said mobile POS terminal operably connects to said network via a White-Fi access point that is disposed within said restaurant.

7. The mobile POS terminal as recited in claim 6, wherein said order processor comprises:
  a television whitespace (TVWS) channel assignment table, that provides a designated TVWS channel, previously received from said backend server, which is employed by said communications elements for communications over said White-Fi network.

8. A dual band mobile point-of-sale (POS) terminal, comprising:
  a state processor, configured to queue state changes in one or more order queues disposed within the mobile POS terminal that correspond to orders in a restaurant;
  a touchpad display/camera circuit, configured to input menu selections and/or payment options;
  an order processor, coupled to said state processor, configured to generate said state changes, and configured to access and transmit said state changes in each one of said one or more order queues to a backend server, from oldest to youngest, when operably connected to a network, wherein said order processor comprises current order state fields corresponding to all of said orders in said restaurant;
  a conventional wireless communications element, enabling the mobile POS terminal to communicate over a Wi-Fi network within said restaurant; and
  a detachable television whitespace (TVWS)/payment processing module, enabling the mobile POS terminal to communicate over a White-Fi network within said restaurant;
  wherein, when programmed in a Wi-Fi mode, the mobile POS terminal communicates only over said Wi-Fi network as a selected wireless network, and when programmed in a White-Fi mode, said mobile POS terminal communicates only over said White-Fi network as said selected wireless network.

9. The mobile POS terminal as recited in claim 8, wherein said network comprises the internet and said selected wireless network.

10. The mobile POS terminal as recited in claim 9, wherein said backend server comprises a cloud-based server.

11. The mobile POS terminal as recited in claim 10, wherein the mobile POS terminal and other POS terminals are configured to generate unique ones of said state changes corresponding to a same one of said one or more orders.

12. The mobile POS terminal as recited in claim 11, wherein, when programmed to operate in said Wi-Fi mode, said mobile POS terminal operably connects to said network via one or more Wi-Fi access points that are disposed within said restaurant.

13. The mobile POS terminal as recited in claim 11, wherein, when programmed to operate in said White-Fi mode, said mobile POS terminal operably connects to said network via a White-Fi access point that is disposed within said restaurant.

14. The mobile POS terminal as recited in claim 13, wherein said order processor comprises:
  a television whitespace (TVWS) channel assignment table, that provides a designated TVWS channel, previously received from said backend server, which is employed by said communications elements for communications over said White-Fi network.

15. An order fulfillment method using a dual band mobile point-of-sale (POS) terminal, the method comprising:
  queuing state changes in one or more order queues disposed within the mobile POS terminal that correspond to orders in a restaurant;
  generating the state changes, and accessing and transmitting the state changes in each one of the one or more order queues to a backend server, from oldest to youngest, when operably connected to a network and maintaining current order state fields corresponding to all of the orders in the restaurant; and
  employing conventional wireless communications elements that enable the mobile POS terminal to communicate over a Wi-Fi network;
  attaching a detachable television whitespace (TVWS)/payment processing module, enabling the mobile POS terminal to communicate over a White-Fi network within said restaurant;
  wherein, when programmed in a Wi-Fi mode, the mobile POS terminal communicates only over the Wi-Fi network as a selected wireless network, and when programmed in a White-Fi mode, the mobile POS terminal communicates only over the White-Fi network as the selected wireless network.

16. The method as recited in claim 15, wherein the network comprises the internet and the selected wireless network.

17. The method as recited in claim 16 wherein the backend server comprises a cloud-based server.

18. The method as recited in claim 17, wherein the mobile POS terminal and other POS terminals generate unique ones of the state changes corresponding to a same one of the one or more orders.

19. The method as recited in claim 18, wherein, when programmed to operate in the Wi-Fi mode, the mobile POS terminal operably connects to the network via one or more Wi-Fi access points that are disposed within the restaurant.

20. The method as recited in claim 18, wherein, when programmed to operate in the White-Fi mode, the mobile POS terminal operably connects to the network via a White-Fi access point that is disposed within the restaurant, and communicates on a designated television whitespace (TVWS) channel that has been previously received from the backend server.

* * * * *